United States Patent
Ostler et al.

(10) Patent No.: US 9,977,769 B2
(45) Date of Patent: *May 22, 2018

(54) ASSESSMENT ITEM GENERATOR

(71) Applicant: Pearson Education, Inc., New Yorkl, NY (US)

(72) Inventors: Wayne Ostler, Iowa City, IA (US); Jason Craft, Austin, TX (US); Philip Moody, Austin, TX (US); Ellen Strain-Seymour, Austin, TX (US)

(73) Assignee: PEARSON EDUCATION, INC., New York, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 15/219,090

(22) Filed: Jul. 25, 2016

(65) Prior Publication Data
US 2017/0083488 A1 Mar. 23, 2017

Related U.S. Application Data

(63) Continuation of application No. 14/860,323, filed on Sep. 21, 2015, now Pat. No. 9,460,162.

(51) Int. Cl.
| | |
|---|---|
| G06F 7/02 | (2006.01) |
| G06F 17/30 | (2006.01) |
| G06F 17/22 | (2006.01) |
| G09B 7/00 | (2006.01) |
| G06F 3/0484 | (2013.01) |

(Continued)

(52) U.S. Cl.
CPC ...... G06F 17/2247 (2013.01); G06F 3/04842 (2013.01); G06F 11/3684 (2013.01); G06F 13/102 (2013.01); G06F 17/227 (2013.01); G06F 17/248 (2013.01); G06F 17/3053 (2013.01); G06F 17/30896 (2013.01); G09B 7/00 (2013.01); G09B 7/02 (2013.01)

(58) Field of Classification Search
CPC .. G06F 11/3684; G06F 17/248; G06F 11/263; G06F 17/2229; G06F 17/30
See application file for complete search history.

(56) References Cited

U.S. PATENT DOCUMENTS

| | | | |
|---|---|---|---|
| 6,421,822 B1 * | 7/2002 | Pavela | G06F 11/3664 714/E11.208 |
| 2003/0017442 A1 * | 1/2003 | Tudor | G09B 7/04 434/322 |

(Continued)

OTHER PUBLICATIONS

Notice of Allowance dated Jun. 2, 2016, for U.S. Appl. No. 14/860,323, all pages.

*Primary Examiner* — Bruce M Moser
(74) *Attorney, Agent, or Firm* — Kilpatrick Townsend & Stockton LLP

(57) ABSTRACT

Techniques described herein relate to generating new assessment items and updating existing assessment items. Input data may be received corresponding to the addition, removal, or modification of assessment components within assessment items, and may cause immediate generation and validation of corresponding markup language data blocks, thereby allowing for interactive construction and automated encoding of assessment items. Additional techniques described herein relate to determining compatible scoring types for assessment items and generating and embedding markup language data blocks corresponding to assessment item scoring data.

20 Claims, 40 Drawing Sheets

(51) Int. Cl.
*G06F 13/10* (2006.01)
*G06F 17/24* (2006.01)
*G06F 11/36* (2006.01)
*G09B 7/02* (2006.01)

(56) References Cited

U.S. PATENT DOCUMENTS

| | | | | |
|---|---|---|---|---|
| 2003/0097233 A1* | 5/2003 | Sutton | ............... | G01R 31/28 |
| | | | | 702/123 |
| 2003/0145252 A1* | 7/2003 | Grey | ............... | G06F 11/3684 |
| | | | | 714/38.1 |
| 2008/0086366 A1* | 4/2008 | Concordia | ............... | G06Q 10/06 |
| | | | | 434/219 |
| 2008/0222454 A1* | 9/2008 | Kelso | ............... | G06F 11/3684 |
| | | | | 714/38.14 |
| 2009/0132313 A1* | 5/2009 | Chandler | ............... | G06Q 10/06 |
| | | | | 705/7.14 |
| 2009/0299993 A1* | 12/2009 | Novack | ............... | G06Q 10/06 |
| 2011/0313963 A1* | 12/2011 | Liu | ............... | G06Q 10/06 |
| | | | | 706/48 |
| 2012/0197750 A1* | 8/2012 | Batra | ............... | G06F 17/30592 |
| | | | | 705/26.7 |
| 2013/0086054 A1* | 4/2013 | Wang | ............... | G06F 17/30168 |
| | | | | 707/725 |
| 2014/0068410 A1* | 3/2014 | Dolinina | ............... | G06F 11/3684 |
| | | | | 715/234 |
| 2014/0101068 A1* | 4/2014 | Gidugu | ............... | G09B 7/02 |
| | | | | 705/327 |
| 2014/0129173 A1* | 5/2014 | Kit | ............... | G06F 11/263 |
| | | | | 702/123 |
| 2015/0206447 A1* | 7/2015 | Vahid | ............... | G09B 5/02 |
| | | | | 434/362 |

* cited by examiner

EXAMPLE MULTIPLE CHOICE ASSESSMENT COMPONENT

- ◉ A. California
- ◯ B. Colorado
- ◯ C. Texas
- ◯ D. Utah

EXAMPLE UPDATED MULTIPLE CHOICE ASSESSMENT COMPONENT

- ○ A. California
- ○ B. Colorado
- ○ C. Texas
- ● D. Utah
- ○ E. Panama

Outcome Declaration

```
<outcomeDeclaration identifier="SCORE" cardinality="single" baseType="float" normalMaximum="7.0" normalMinimum="0.0"/>
<outcomeDeclaration identifier="SCORE_A" cardinality="single" baseType="float" normalMaximum="1.0" normalMinimum="0.0"/>
<outcomeDeclaration identifier="SCORE_B" cardinality="single" baseType="float" interpretation="scoreSystem:human" responseIdentifier:RESPONSE_B" normalMaximum="1.0" normalMinimum="0.0"/>
```

Template Declaration

```
<templateDeclaration identifier="allCorrect" cardinality="single" baseType="float">
  <defaultValue>
    <value>
      2
    </value>
  </defaultValue>
</templateDeclaration>
```

FIG. 11J

```xml
Response Processing

<responseProcessing templateLocation="abbl-score-no-partial-credit">
 <responseCondition>
  <responseIf>
   <match>
    <variable identifier="RESPONSE_A"/>
    <correct identifier="RESPONSE_A"/>
   </match>
   <setOutcomeValue identifier="SCORE_A">
    <baseValue baseType="float">
     1
    </baseValue>
   </setOutcomeValue>
  </responseIf>
  <responseElse>
   <setOutcomeValue identifier="SCORE_A">
    <baseValue baseType="float">
     0
    </baseValue>
   </setOutcomeValue>
  </responseElse>
 </responseCondition>
 <responseCondition>
  <responseIf>
   <equal>
    <sum>
     <variable identifier="SCORE_A"/>
     <variable identifier="SCORE_B"/>
    </sum>
    <default identifier="allCorrect"/>
   </equal>
   <setOutcomeValue identifier="SCORE">
    <baseValue baseType="float">
     7
    </baseValue>
   </setOutcomeValue>
  </responseIf>
  <responseElse>
   <setOutcomeValue identifier="SCORE">
    <baseValue baseType="float">
     0
    </baseValue>
   </setOutcomeValue>
  </responseElse>
 </responseCondition>
</responseProcessing>
```

FIG. 11K

ASSESSMENT ITEM GENERATOR

CROSS-REFERENCES TO RELATED APPLICATIONS

The present application is a continuation of U.S. application Ser. No. 14/860,323, filed Sep. 21, 2015, and entitled "ASSESSMENT ITEM GENERATOR," the entire contents of which are incorporated herein by reference for all purposes.

BACKGROUND

Certain content distribution networks and systems may be configured to generate and provide content resources such as assessment items to user devices using various different techniques. Assessment items may include data objects that encapsulate representations of interactive components and/or corresponding responses to the interactive components. Each assessment item may include one more assessment components, each of which may be a simple or complex assessment component. Such assessment components include, for example, text input assessment components, multiple choice assessment components, mathematical equation assessment components, item matching assessment components, and other various types of assessment components. Assessment item data objects also may define valid and correct responses associated with their respective assessment components, within their various data structures, data types, and data formats. In some cases, multi-part assessment items may define dependencies and other inter-relations between the assessment components which determine the functionality and/or scoring of the individual assessment components within the assessment item.

BRIEF SUMMARY

Various techniques (e.g., systems, methods, computer-program products tangibly embodied in a non-transitory machine-readable storage medium, etc.) are described herein for generating new assessment items and updating existing assessment items based on the addition, removal, or modification of assessment components within assessment items. In some embodiments, requests may be received via client devices to generate new assessment items and/or update existing assessment items. An assessment item generator may retrieve shell markup language data blocks corresponding to the requested assessment item. One or more assessment components may be added, modified, or removed based on input received from the client devices via programmatic or graphical interfaces, and the assessment item generator may generate markup language data blocks corresponding to the new or updated assessment components. In some cases, markup language data blocks corresponding to new or updated assessment components may be embedded at one or more locations within the assessment item shell, and the markup language data block for the assessment item may be validated, rendered to client devices, and/or saved in an assessment item data store.

Additional techniques described herein relate to generating and embedding markup language data blocks corresponding to assessment item scoring data. In some embodiments, modifications may be received for new or existing assessment components within an assessment item. Based on the requested modifications, an assessment item generator may determine one or more compatible scoring types (or scoring methods) for the updated assessment item. An assessment item scoring interface may be provided based on the compatible scoring types, and scoring data may be received via the scoring interface. Using the received scoring data the assessment item generator may generate markup language data blocks corresponding to the assessment item scoring data, and embed the scoring data at various locations within the assessment item shell. Additionally, in some cases, markup language data blocks for updated assessment items may be validated, rendered to client devices, and/or saved in assessment item data stores.

BRIEF DESCRIPTION OF THE DRAWINGS

FIGS. 8A-8F and 9A-9O illustrate example output from an assessment item generator in connection with generating new assessment items and/or updating existing assessment items, according to one or more embodiments of the disclosure.

FIGS. 11A-11K illustrate example output from an assessment item generator in connection with generating scoring data for assessment items, according to one or more embodiments of the disclosure.

Figure 1:
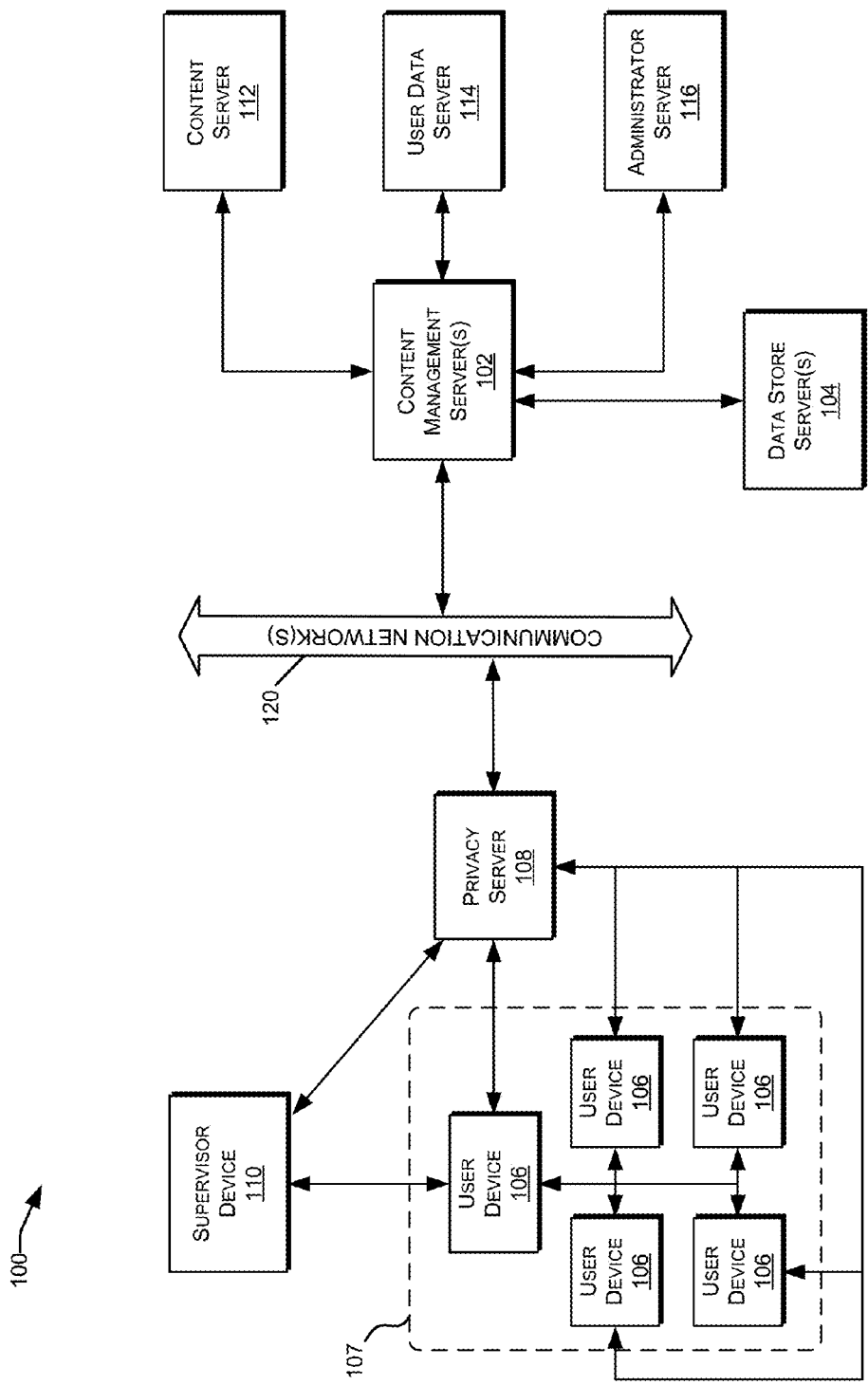
FIG. 1 is a block diagram showing illustrating an example of a content distribution network.

In the appended figures, similar components and/or features may have the same reference label. Further, various compo of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory machine-readable storage medium, etc.) are described herein for generating new assessment items and updating existing assessment items based on the addition, removal, or modification of assessment components within assessment items. In some embodiments, requests may be received via client devices to generate new assessment items and/or update existing assessment items. An assessment item generator may retrieve shell markup language data blocks corresponding to the requested assessment item. One or more assessment components may be added, modified, or removed based on input received from the client devices via programmatic or graphical interfaces, and the assessment item generator may generate markup language data blocks corresponding to the new or updated assessment components. In some cases, markup language data blocks corresponding to new or updated assessment components may be embedded at one or more locations within the assessment item shell, and the markup language data block for the assessment item may be validated, rendered to client devices, and/or saved in an assessment item data store.

Additional techniques described herein relate to generating and embedding markup language data blocks corresponding to assessment item scoring data. In some embodiments, modifications may be received for new or existing assessment components within an assessment item. Based on the requested modifications, an assessment item generator may determine one or more compatible scoring types (or scoring methods) for the updated assessment item. An assessment item scoring interface may be provided based on the compatible scoring types, and scoring data may be received via the scoring interface. Using the received scoring data the assessment item generator may generate markup language data blocks corresponding to the assessment item scoring data, and embed the scoring data at various locations within the assessment item shell. Additionally, in some cases, markup language data blocks for updated assessment items may be validated, rendered to client devices, and/or saved in assessment item data stores.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102)

located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
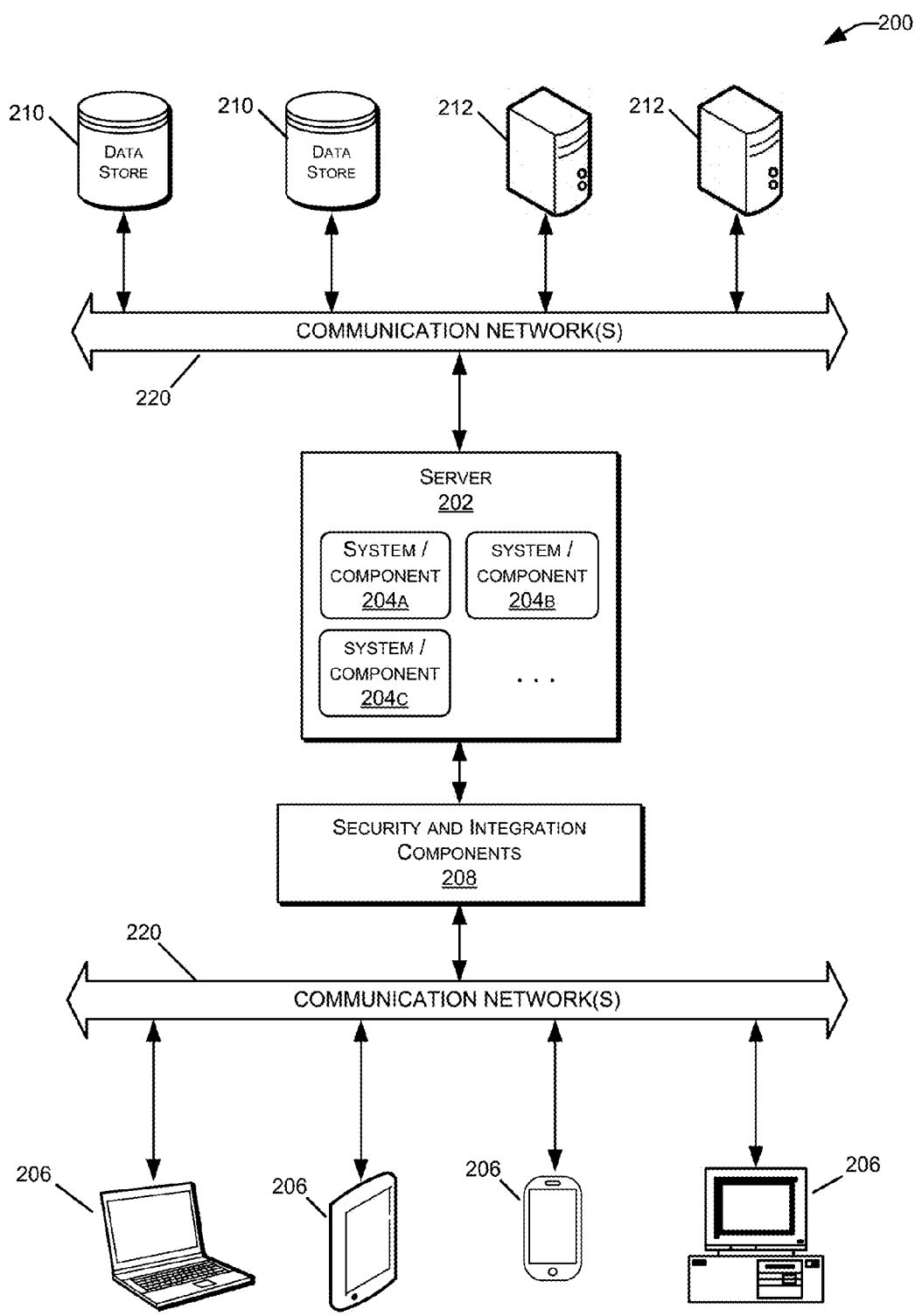
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
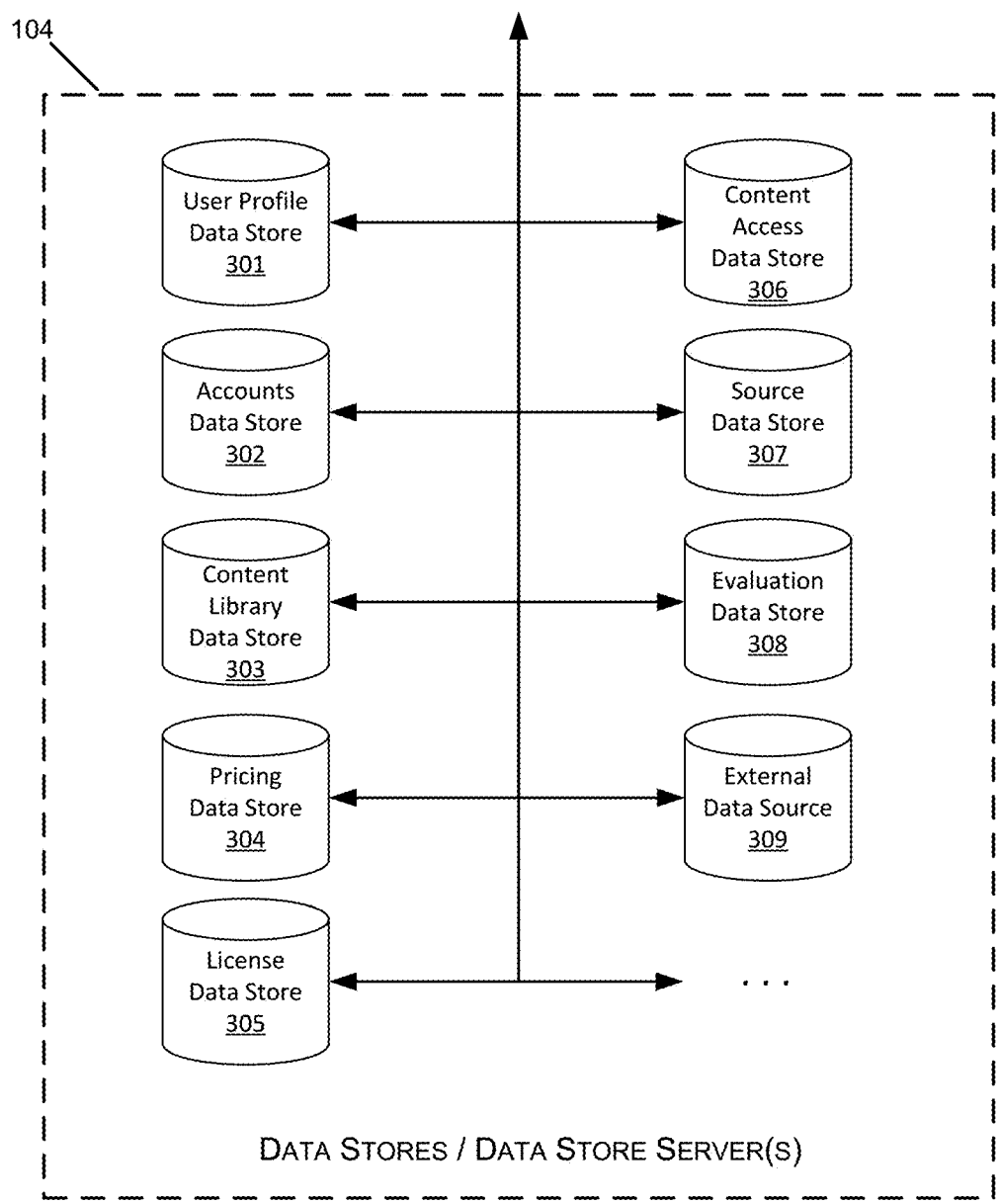
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
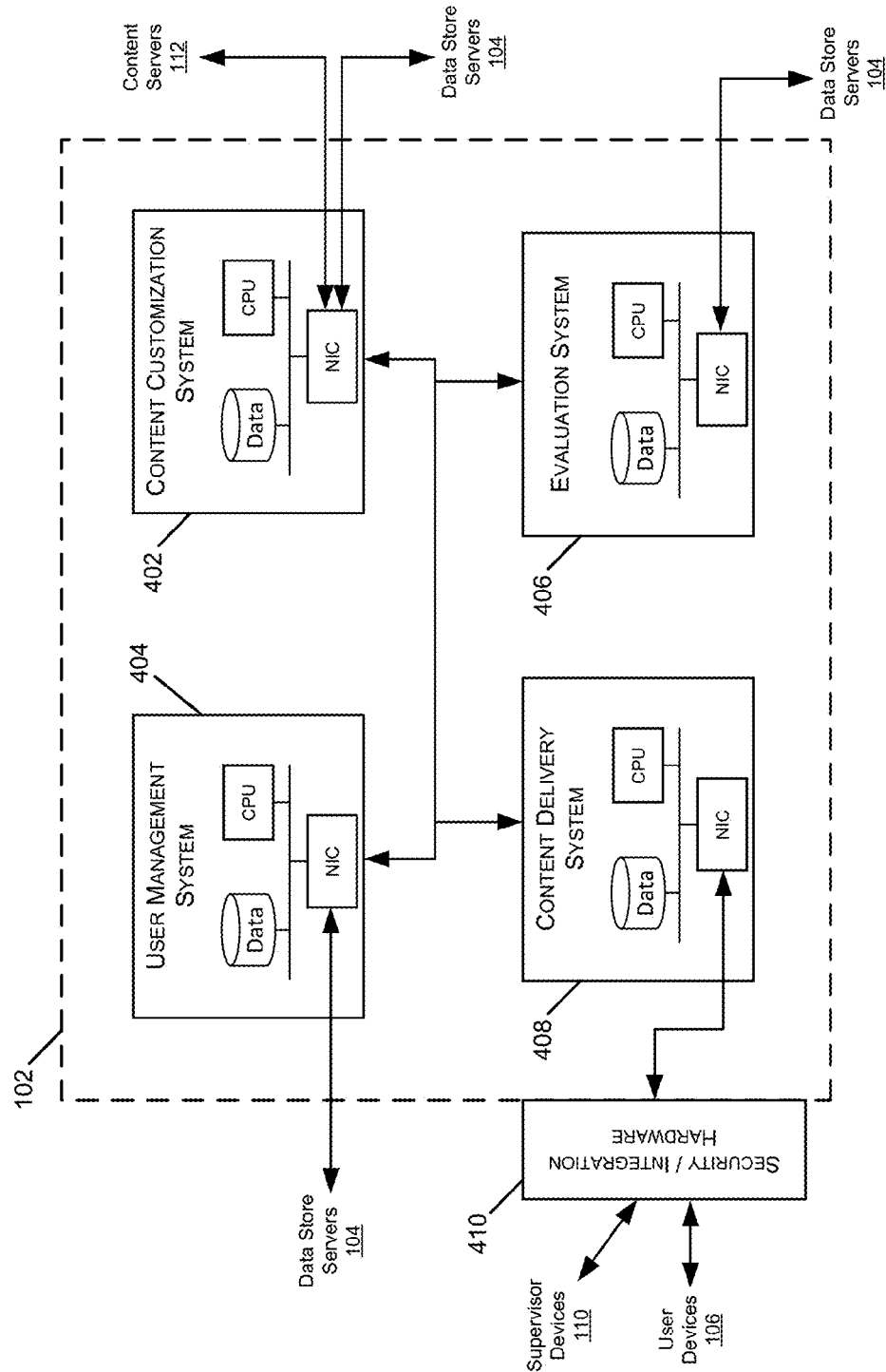
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
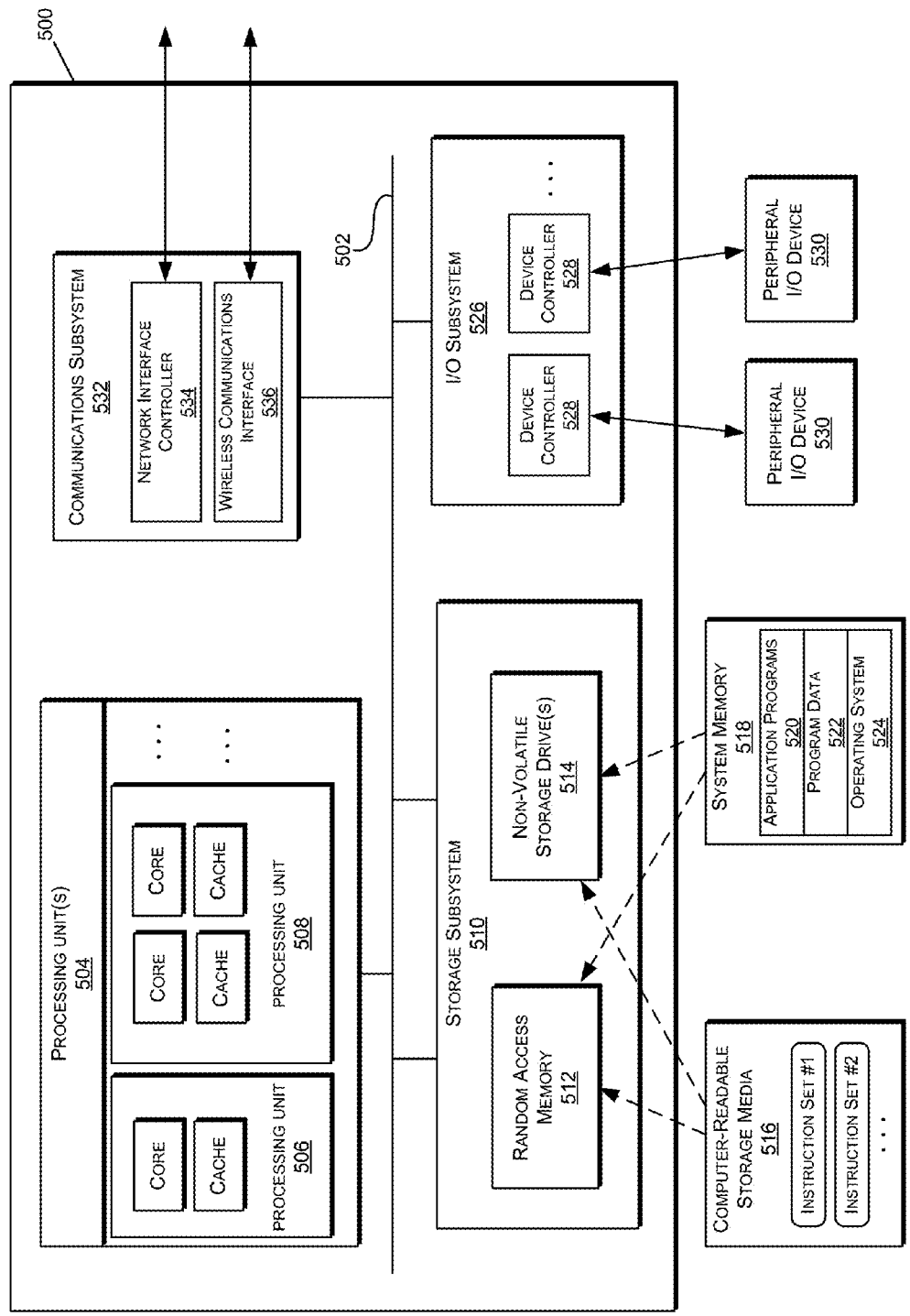
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
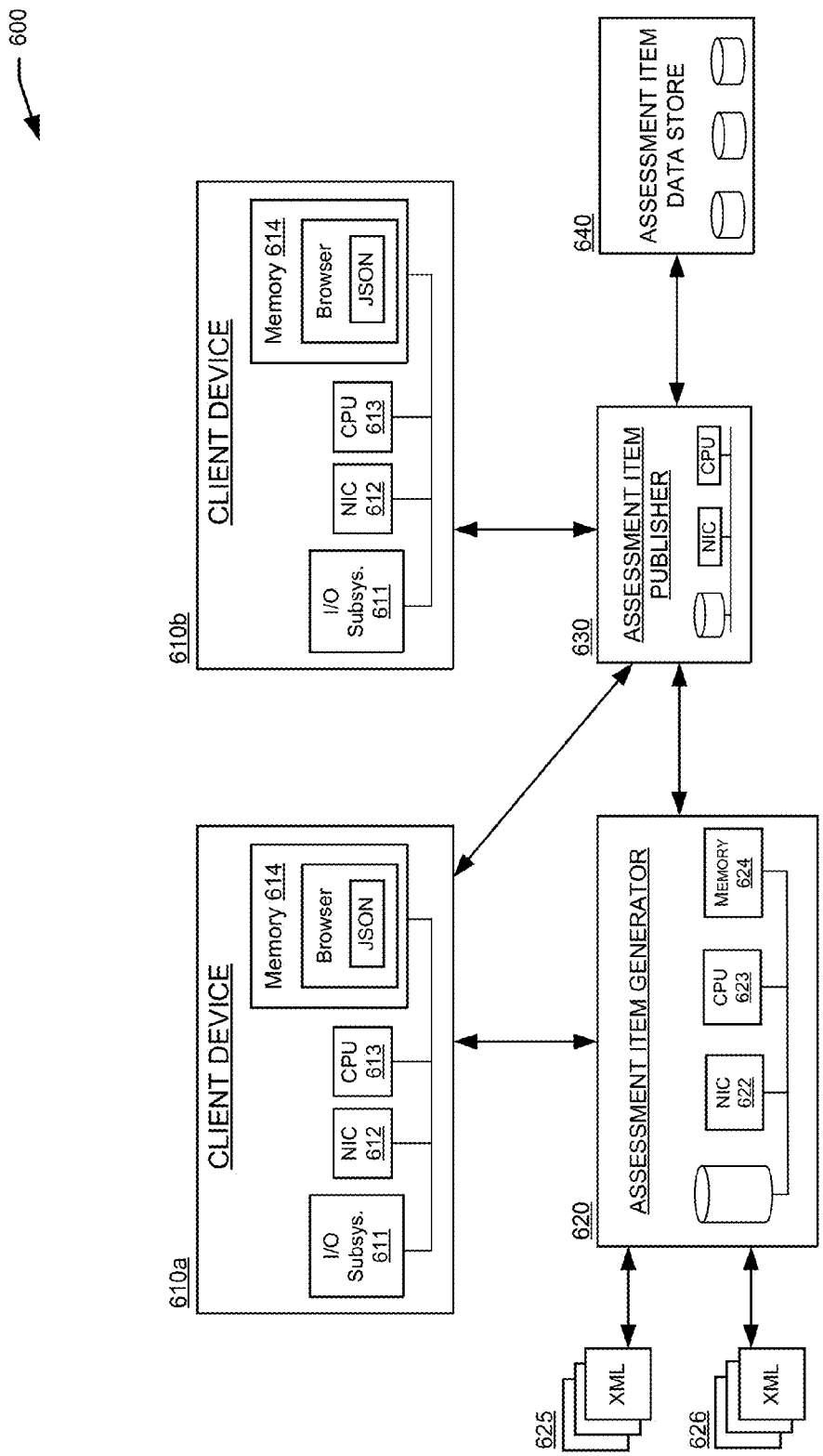
FIG. 6 is a block diagram illustrating an example system including an assessment item generator and a plurality of client devices, according to one or more embodiments of the disclosure.

With reference now to FIG. 6, a block diagram is shown illustrating an example of an assessment item generator system 600. As shown in this example, an assessment item generator system 600 may include one or more client devices 610 configured to communicate with an assessment item generator 620. As discussed below, assessment item generator 620 may be configured to construct and encode assessment items having one or more assessment components, including defining, encoding, and validating various types of interrelated assessment components and corresponding scoring logic for the assessment items. Client devices 610 may be configured to receive user input/output corresponding to definitions of assessment item definitions, specifications, and scoring logic, define and execute scoring logic for the assessment items, and provide various dynamic interfaces to receive assessment item data and output representations of assessment items and related data objects. As used herein, assessment items may refer to data objects encapsulating representations of interactive components and/or corresponding responses to the interactive components. For example, assessment items may correspond to question data objects and/or test data objects, where such data objects may define a number of questions (and/or other responsive/interactive components) to be presented to a user. In some cases, the assessment item data objects also may define one or more valid and/or correct responses to the questions, along with a scoring data and logic to allow the user's responses to be evaluated and quantified. Assessment items may be generated using various different data structures, data types, and data formats. For instance, the IMS Global Learning Consortium, Inc. has published a number of Question & Test Interoperability (QTI) specifications for assessment items. These QTI specifications, along with other various standards for representing assessment items, may describe data models for representing question data and test data, along with and their corresponding results reports. Thus, the QTI specifications and other assessment items standards may enable the transmission of assessments items between various computing systems (e.g., authoring tools at client devices 610, assessment item data stores 640, question/test constructional tools, electronic learning systems and assessment delivery systems, and the like). Data models defined by the QTI specifications may be used in various embodiments described herein, in which QTI-compliant eXtensible Markup Language (XML) may be generated by the assessment item generator 620. In some embodiments, use of QTI-compliant specification for generating, storing, and exchanging assessment items may support both interoperability and innovation through the provision of well-defined extension points which may be used wrap specialized data.

In some embodiments, assessment item generator systems 600 may be integrated within, or configured to operate in collaboration with, one or more content distribution networks 100. For example, system 600 may be the same as, or may operate within or in collaboration with, any of the content distribution network (CDNs) 100 described above. Thus, specific examples of assessment item generator systems 600 may include, without limitation, educational and professional training systems and networks, interactive gaming systems and networks, media distribution systems and networks, and enterprise application systems and networks, websites and other Internet-based systems and networks. Accordingly, in the various different implementations of assessment item generator systems 600 as (or integrated into) CDNs 100, assessment items may correspond to test items or examination question items (e.g., in educational and professional training CDNs 100), evaluation or survey items (e.g., in enterprise applications or online Internet-based CDNs 100), or product/media feedback items (e.g., in interactive gaming or media distribution CDNs 100), etc.

In some cases, assessment item generators 620 may be implemented within one or more content management servers 102 and/or other CDN servers, assessment item publishers 630 and assessment item data stores 640 may be implemented within one or more content servers 112, and/or data store servers 104, and client devices 610 may correspond to the user devices 106 and 110 described above in reference to CDN 100. Thus, within assessment item generator system 600 (which may also be referred to as CDN 600 when describing certain embodiments), client devices 610 may interact with an assessment item generator 620 to construct, retrieve, and modify assessment items using the hardware and software components of the user devices 610 and/or assessment item generator 620, and store data objects corresponding to the assessment items in one or more assessment item data stores 640 (e.g., data store servers 104, content servers 112). In other examples, an assessment item generator 620 may be implemented using one or more computer servers, and other specialized hardware and software components, separately from any other CDN components such as content servers 112, content management servers 102, data store servers 104, and the like. In these examples, the assessment item generator 620 may be configured to communicate directly with client devices 610, or indirectly through content management servers 102 and/or other components and communications networks of the CDN 600.

In order to perform these features and other functionality described herein, each of the components and sub-components discussed in the example assessment item generator system 600 may correspond to a single computer server or a complex computing system including a combination of computing devices, storage devices, network components, etc. Each of these components and their respective subcomponents may be implemented in hardware, software, or a combination thereof. Certain client devices 610 may communicate directly with the assessment item generator 620, while other client devices 610 may communicate with the assessment item generator 620 indirectly via one or more intermediary network components (e.g., routers, gateways, firewalls, etc.) or other devices (e.g., content management servers 102, content servers 112, etc.). Although the physical network components have not been shown in this example so as not to obscure the other elements depicted in the figure, it should be understood that any of the network hardware components and network architecture designs may be implemented in various embodiments to support communication between the servers and devices in the system 600. Additionally, different client devices 610 may use different networks and networks types to communicate with the assessment item generator 620, including one or more telecommunications networks, cable networks, satellite networks, cellular networks and other wireless networks, and computer-based IP networks, and the like. Further, certain components within assessment item generator system 600 may include special purpose hardware devices and/or special purpose software, such as those included in I/O subsystems 611 and client application memory 614 of the client devices 610, as well as those within the processing engines within the memory 624 of the assessment item generator 620, and XML assessment component libraries 625 and XML scoring model libraries 626 associated with the assessment item generator 620, discussed below.

As discussed below, system 600 and other embodiments described herein may be used to generate new assessment items, retrieve and update existing assessment items, generate encoding of assessment component relationships and assessment item scoring logic, validate and publish assessment items, and perform other assessment item functionality described herein. In various embodiments, assessment items may include a single simple or complex assessment component, or may include multiple assessment components. As discussed in more detail below, assessment components refer to individual questions or other responsive/interactive user interface components within an assessment items. Assessment items having multiple assessment components may be referred to as multi-part items and may represent, for example, multi-part questions or tests, or other groupings of related assessment components. In some cases, multi-part assessment items may define dependencies and other inter-relations between the assessment components which determine the functionality and/or scoring of the individual assessment components within the item.

Although this functionality may be described below in terms of a client-server model, such the example assessment item generator system 600, it should be understood that other computing environments and various combinations of servers and devices may be used to perform the functionality described herein in other examples. For instance, although the generation of new assessment items, retrieval and updating of existing assessment items, and other features described below, may be performed by a web server (e.g., assessment item generator 620) in collaboration with a client application (e.g., web browser) executing on client devices 610, in other cases these techniques may be performed entirely by a specialized assessment item generator 620, or entirely by an authoring tool executing on a client device 610. In other examples, a client-server model may be used as shown in system 600, but different functional components and processing tasks may be allocated to the client-side or the sever-side in different embodiments. Additionally, the assessment item publisher 630, assessment data store, and/or the XML libraries 625-626 may be implemented as separate servers or storage systems in some cases, and may use independent hardware and software service components. However, in other implementations, some or all of the assessment item publisher 630, assessment data store, and/or the XML libraries 625-626 may be incorporated into the assessment item generator 620 and/or client devices 610.

Client devices 610 may include desktop or laptop computers, smartphones, tablet computers, and other various types of computing devices, each of which may include some or all of the hardware, software, and networking components discussed above. Specifically, a client device 610 may be any computing device with sufficient processing components, memory and software components, and I/O system components for interacting with users and with the assessment item generator 620 to define and construct assessment items. Accordingly, client devices 610 may include the necessary hardware and software components to establish the network interfaces, security and authentication capabilities, and capabilities for assessment item storage, validation, and testing. In this example, client devices 610 each include an I/O subsystem 611, network interface controller 612, a processing unit 613, a memory 614 configured to operate client software applications. Client device 610 may be configured to receive and execute various programmatic and graphical interfaces to define, construct, validate, and store assessment items having various types of assessment components and defined scoring functionality. Accordingly, each I/O subsystem 611 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different client devices 610 may support different input and output capabilities within their I/O subsystems 611, and thus different types of interactions with assessment items/components may be compatible or incompatible with certain client devices 610. For example, certain types of assessment components may require specific types of processors, graphics components, network components, or I/O components in order to be optimally designed and constructed using a client device 610. In some embodiments, users may establish user-specific preferences for constructing and generating specific types of assessment components and assessment items on specific types of client devices 210. Additionally, as shown in this example, the memory 614 of client devices 610 may include web browser software having browser-native support for JavaScript Object Notation (JSON). As discussed below, JSON data objects may be generated and stored within the browser memory, and used to implement the scoring logic for assessment items.

In some embodiments, the assessment item generator 620 may generate and provide the software interfaces (e.g., via a web-based application or other programmatic or graphical interface techniques) used by the client device 610 to define and construct assessment items. In response to receiving inputs from a client device 610 corresponding to assessment items, assessment components, scoring types, etc., the assessment item generator 620 may generate, validate, and store the underlying data objects representing the assessment items. As shown in this example, assessment item generator 620 also may establish communication sessions with additional servers, storage libraries, and other computing devices 610, such as XML libraries 625-626 for assessment items and scoring templates, assessment item publisher 630, and/or assessment item data store 640. In other to perform the tasks described herein, assessment item generators 620 and/or assessment item publishers 630 may include components such as network interface controllers 622, processing units 623, and memory 624 configured to store server software, handle authentication and security, and store/retrieve assessment items from data stores 640. The assessment item generator 620, assessment item publisher 630, and assessment item data store 640, may be implemented as separate software (and/or storage) components within a single computer server 620 in some examples, while in other examples may be implemented as separate computer servers/systems having separate dedicated processing units, storage devices, and/or network components.

Figure 7:
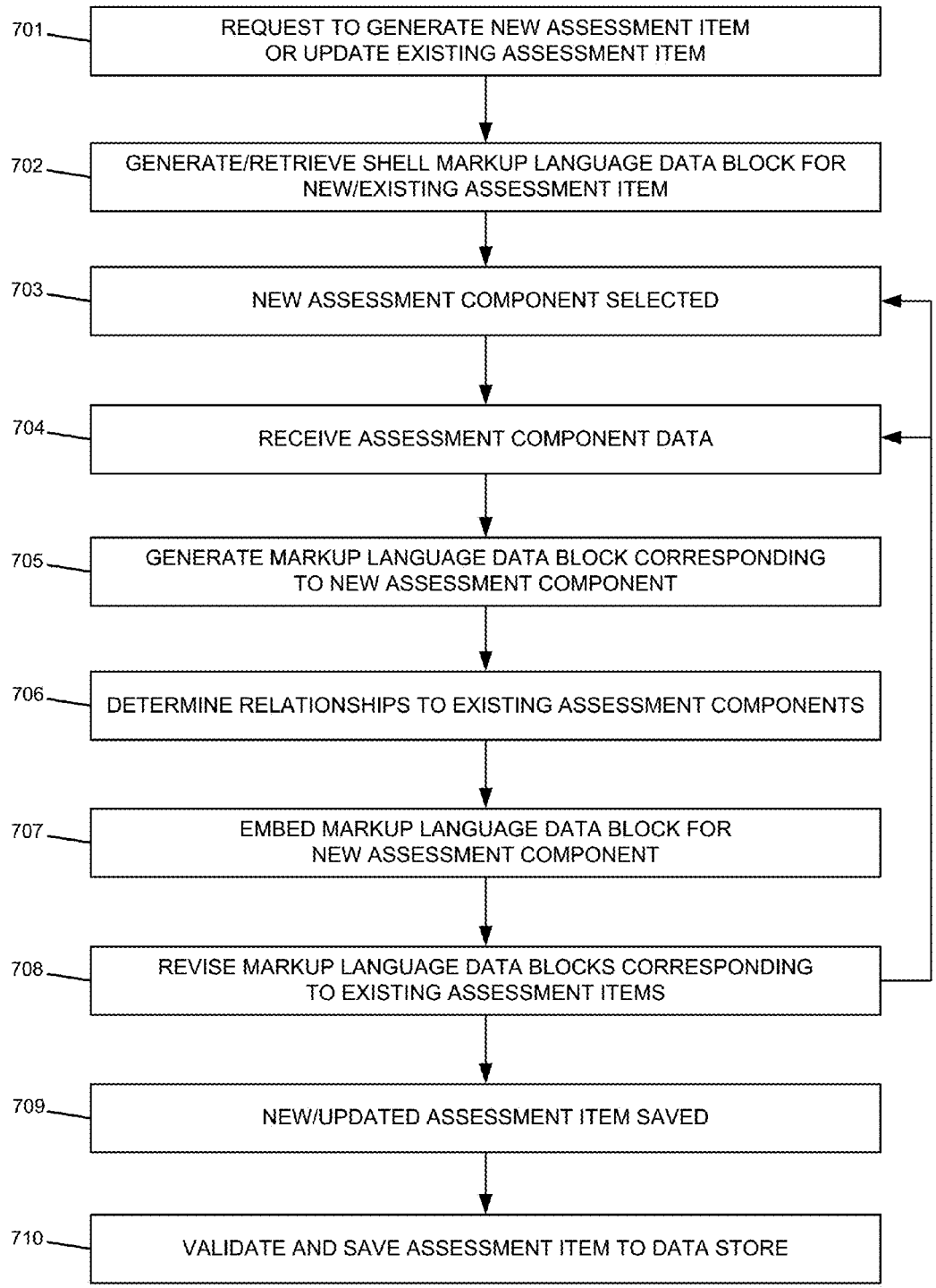
FIG. 7 is a flow diagram illustrating an example process of generating a new assessment item and/or updating an existing assessment item, according to one or more embodiments of the disclosure.

Referring now to FIG. 7, a flow diagram is shown illustrating a process of generating a new assessment item and/or updating an existing assessment item. As described below, the steps in this process may be performed by one or more components in the assessment item generator system 600 described above. For example, each of the steps 701-710 may be described below in terms of the assessment item generator 620. However, in other examples, some or all of the steps 701-710 described below may be performed on the client side at one or more client devices 610. In still other examples, certain features described below in may be performed by an assessment item publisher 630 and/or assessment item data store 640. It should also be understood that the various features and processes described herein, including receiving input data via programmatic or graphical interfaces, and generating data corresponding to assessment components and assessment items need not be limited to the specific systems and hardware implementations described above in FIGS. 1-6.

In step 701, a request may be received to generate a new assessment item or update an existing assessment item within an assessment item data store 640. In some embodiments, assessment item generator 620 may provide one or more interfaces to client devices 610 from which users may initiate requests in step 710. In some cases, the assessment item generator 620 may provide interfaces in the form of web pages, web-based applications, and other graphical interface applications accessible to client devices 610. For instance, the request in step 701 may be received via a graphical assessment item authoring tool executing on the generator server 620 and/or client devices 610. Additionally or alternatively, the assessment item generator 620 may expose programmatic interfaces (e.g., API's) which client software 614 may invoke to initiate the generation of a new assessment item or updating of an existing assessment item.

In step 702, in response to the request to generate or update an assessment item received in step 701, assessment item generator 620 may either generate a new assessment item data object (e.g., for a new assessment item), or retrieve the stored data object(s) corresponding the requested assessment item (e.g., for an existing assessment item). As noted above, assessment item data stores 640, which may be implemented within the assessment item generator 620 or on a separate server/storage system (e.g., content server 112) may contain a library of the existing assessment items that have been created, validated, and/or deployed within the system 600/CDN 100.

In some embodiments, the data object(s) generated or retrieved in step 702 may correspond to shell markup language data blocks. For example, as noted above, assessment items may be stored as QTI-compliant eXtensible Markup Language (XML) data objects, although other standards and data structures may be used as well for generating and storing assessment items. By way of introduction only, a brief description will now be provided of the high-level structure of QTI assessment items, along with certain QTI classes (which may correspond to XML elements in QTI-compliant XML) that may appear in the examples subsequently discussed herein. It should be understood that this brief description is incomplete and including for introductory purposes only. Thus, in some cases, the data objects generated and/or retrieved in step 702 may correspond with the brief description described below, although this high-level description is illustrative only and need not apply for all QTI-compliant assessment items.

For assessment items complying with the QTI specification, each assessment item may be stored as a data object including several nested class objects represented by XML elements. For instance, the "assessmentItem" class, represented by an "assessmentItem" XML element is the high-level object that encompasses all of the information to be presented to users (e.g., question data, response/interactive components, and other content), as well as the information defining how to score the assessment item. The "assessmentItem" class/XML element may contain several sub-classes/sub-elements, including an "itemBody" class/XML element, one or more "responseDeclaration" classes/XML elements, one or more "outcomeDeclaration" classes/XML elements, a "templateDeclaration" class/XML element, and/or a "responseProcessing" class/XML element. The "itemBody" class/XML element contains data objects describing all of the content and structure of the assessment item, such as text, graphics, media objects and assessment components (which also may be referred to herein as "interactions"). The itemBody of an assessment item may be presented by combining the itemBody XML element with stylesheet information. The "responseDeclaration" class contains declarations of response variables which are bound to assessment components (or "interactions") within the itemBody. The "outcomeDeclaration" class may contain declarations of outcome variables. The "templateDeclaration" class may contain declarations of item variables used specifically for cloning items, and may be referred to within the itemBody for cloned items. The "responseProcessing" class may contain data defining how the values of response variables are scored, and how the values of item outcomes are assigned.

In step 703, the assessment item generator 620 may receive a selection of a new assessment component to be added to assessment item generated or retrieved in step 702. Assessment components may include test questions, user feedback interfaces, or any other user interface component designed to receive input or illicit a user response. Various different types of assessment components may be supported in different embodiments, including but not limited to text input assessment components, multiple choice assessment components, mathematical equation assessment components, item matching assessment components, etc. For QTI-compliant assessment items, assessment components may correspond to any QTI "interaction" class/XML element through which users may select or construct a response to a question. Within QTI, each interaction is associated with one or more response variables.

Figure 8A:
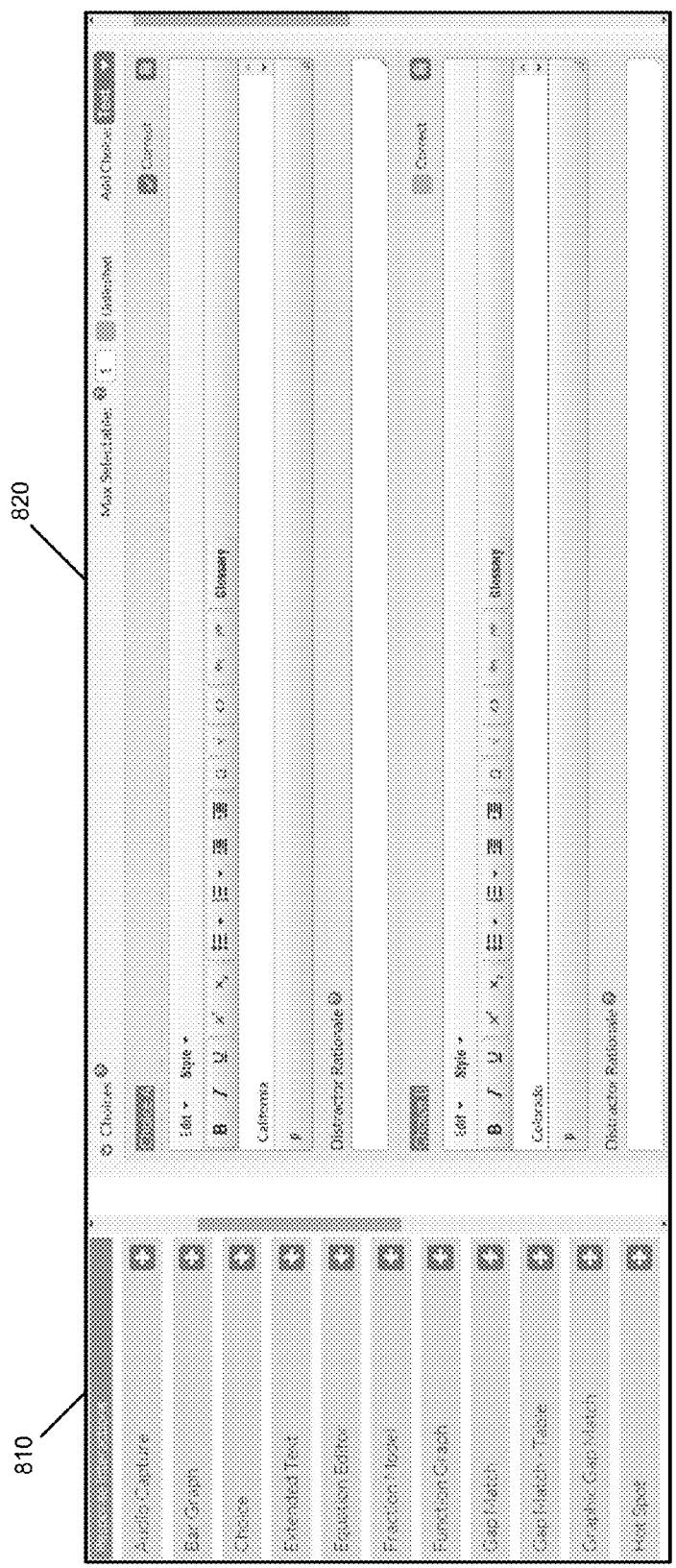

As discussed above, the assessment item generator 620 may provide one or more interfaces to client devices 610 through which users may select assessment components. An example of a web-based graphical interface that may be provided by the assessment item generator 620 is shown in FIG. 8A. In this example, a first interface region 810 includes various different types of assessment components which may selected (e.g., by clicking, dragging-and-dropping, etc.) into a second interface region 820 representing the assessment item. A multiple choice assessment component (e.g., a QTI choice interaction) has been selected and added to the second interface region 820.

In step 704, the assessment item generator 620 may receive additional assessment component data relating to the new assessment component selected in step 703. For example, for the multiple choice assessment component (e.g., QTI choice interaction) shown in FIG. 8A, the user may input the question text, change the number of possible choices, input answer text for each choice, identify the correct answer, and the like. For instance, referring to FIG. 8B, an example presentation is shown for the multiple choice assessment component from region 820 in FIG. 8A, in which assessment component data has been input to define the number of choices, the text answers for each choice, and the correct answer. It should be understood that these examples of assessment component data are illustrative only and non-limiting, and that different assessment components types (e.g., any of the QTI interaction classes) may have different sets of subclasses and attributes as assessment component data.

In step 705, after the assessment component has been selected in step 703 and assessment component data has been received in step 704, the assessment item generator 620 may generate one or more data objects corresponding to the assessment component. As discussed above, the data object(s) generated or retrieved in step 705 may be markup language data blocks, for instance, QTI-compliant XML data blocks. For instance, referring to FIG. 8C, an example markup language data block is shown, QTI-compliant XML in this case, representing the multiple choice assessment component shown in FIGS. 8A and 8B.

In some embodiments, the assessment item generator 620 may use an XML generator and/or encoder to construct the XML output based on the input data received in steps 703 and 704. In some cases, the assessment item generator 620 may maintain an XML template library 625 containing a XML template corresponding to each different assessment component type (e.g., each different QTI interaction class). In such cases, the assessment item generator 620 may retrieve the appropriate XML template from the library 625 based on the assessment component selected in step 703, and then customize that XML template based on the assessment component data received in step 704.

In step 706, the assessment item generator 620 may determine the relationships between the new assessment component and any existing assessment components within the same assessment item. The relationships determined in step 706 may correspond to how multiple assessment components within a single assessment will be visually presented to users. For example, a newly added assessment component may be presented below, above, or in between the existing assessment components embedded within an assessment item data object. Additionally, certain types of assessment components may be embedded within the same or other types of assessment components. In some cases, the graphical interfaces provided by the assessment item generator 620 in steps 703 and 704 may allow users to define relationships among assessment components, for example, by dragging and dropping assessment components, using up and down arrows to position assessment components, etc. Programmatic interfaces (e.g., APIs) also may provide the functionality to client devices 610 to define relationships between multiple assessment components in an assessment item.

In step 707, the data object(s) generated in step 705, corresponding to the new assessment component, may be embedded within the shell data object(s) generated/retrieved in step 702, corresponding to the assessment item as a whole. For example, referring again to the sample QTI-compliant XML shown in FIG. 8C, the markup language data block representing the multiple choice assessment component is found from lines 3 to 37. In other examples, embedding the markup language data block in step 707 may include embedded several small data blocks (e.g., individual XML elements, attributes, etc.) rather than one large data block representing the new assessment component. Additionally, the embedding in step 707 may depend on the relationship between the multiple assessment components determined in step 706. The example shown in FIGS. 8A-8C includes a single multiple choice assessment component only, and thus multi-part item relationship determinations are applicable. However, additional examples involving multi-part assessment items are discussed below in reference to FIGS. 9A-9O.

In step 708, the assessment item generator 620 may revise one or more other markup language data blocks corresponding to the assessment components existing within the assessment item before the newly embedded component. In the example shown in FIGS. 8A-8C, only a single assessment component is represented, and therefore no revision of pre-existing assessment components is necessary. However, as discussed below in more detail in reference to FIGS. 9A-9O, the addition, removal, or modification of a one assessment component in an assessment item may necessitate changes in the data (e.g., markup language data blocks) representing the other assessment components in the assessment item. As described below, the assessment components within a multi-part assessment item may have dependencies and interrelations that require revising other assessment components in response to changing a first assessment component.

Figure 8D:
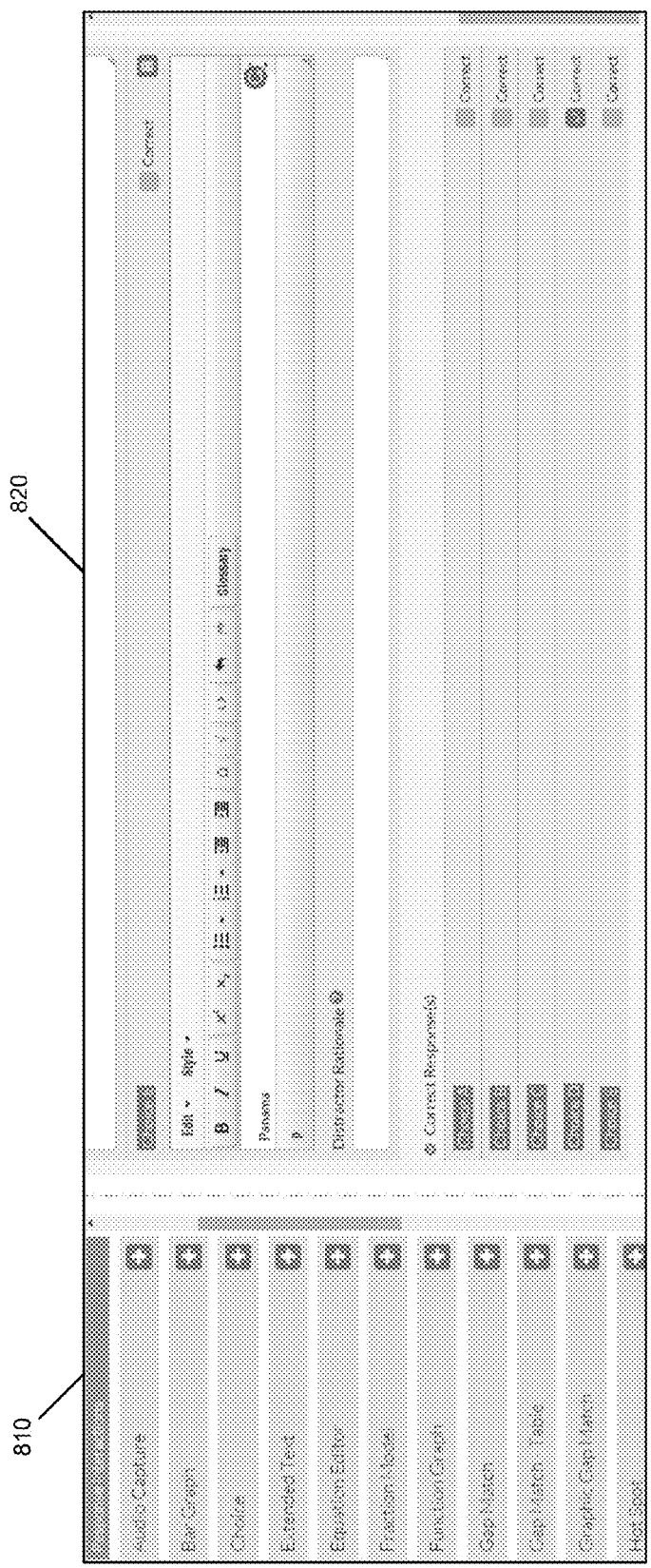

As shown in FIG. 7, after embedding the data for the new assessment component in step 707 and revising the data for the other assessment components in step 708, the process may return back to step 703 or 704 in some cases. For example, a return to step 703 may indicate that the assessment item generator 620 has received a selection of a second new assessment component to be added to assessment item generated or retrieved in step 702. A return to step 704 may indicate that the assessment item generator 620 has received addition assessment component data further modifying the newly added assessment component. For example, referring now to FIGS. 8D-8F, an example is shown of a modification to the assessment component represented in FIGS. 8A-8C. In this example, a modification has been made via the second interface region 820 in FIG. 8D to add an additional response option ("Choice E") and to change the designated correct answer to Choice D. FIGS. 8E and 8F respectively illustrate the graphical presentation view of the updated assessment component, and the markup language representing the updated assessment item.

Thus, the process shown in this example may loop back from step 708 to steps 703 or 704 any number of times, allowing users to construct and modify assessment items in stages by generating or altering individual assessment components one at a time. Although the example process shown in FIG. 7 only includes adding new assessment components (step 703), similar techniques may be used to allow removal of assessment components from assessment items. For instance, after an assessment component is removed steps similar to those described above may be performed, although the markup language data block may be identified and removed in steps 705 and 707 respectively, rather than generated and embedded in the case of new assessment components. Additional examples of generating, modifying, and removing assessment components from an assessment item are discussed below in reference to FIGS. 9A-9O.

In step 709, the assessment item generator 620 receives data indicating that the newly generated or updated assessment item should be saved. The data in step 709 may be received from the connected client device 610 via the same graphical interface or programmatic interface used by the client device 610 to initiate steps 701-708 on the generator 620. For example, after adding, modifying, and/or removing one or more assessment components in an assessment item, a user may input data indicating that the modification process is completed and that the updated assessment item should be saved in an assessment item data store 640. Accordingly, in step 710, the assessment item generator 620 may validate and/or save the modified assessment item to the assessment item data store 640 or other storage system.

Figure 9A:
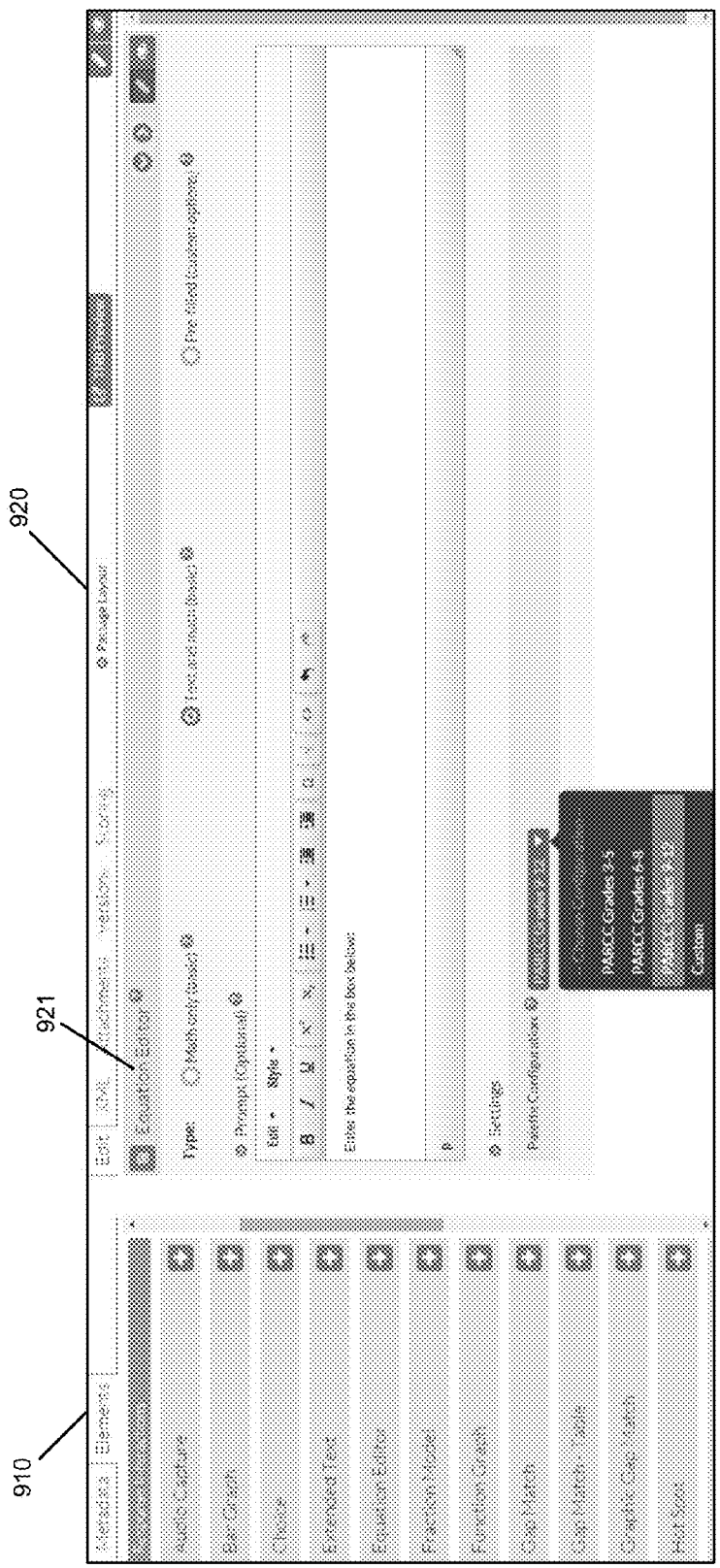
Figure 9B:
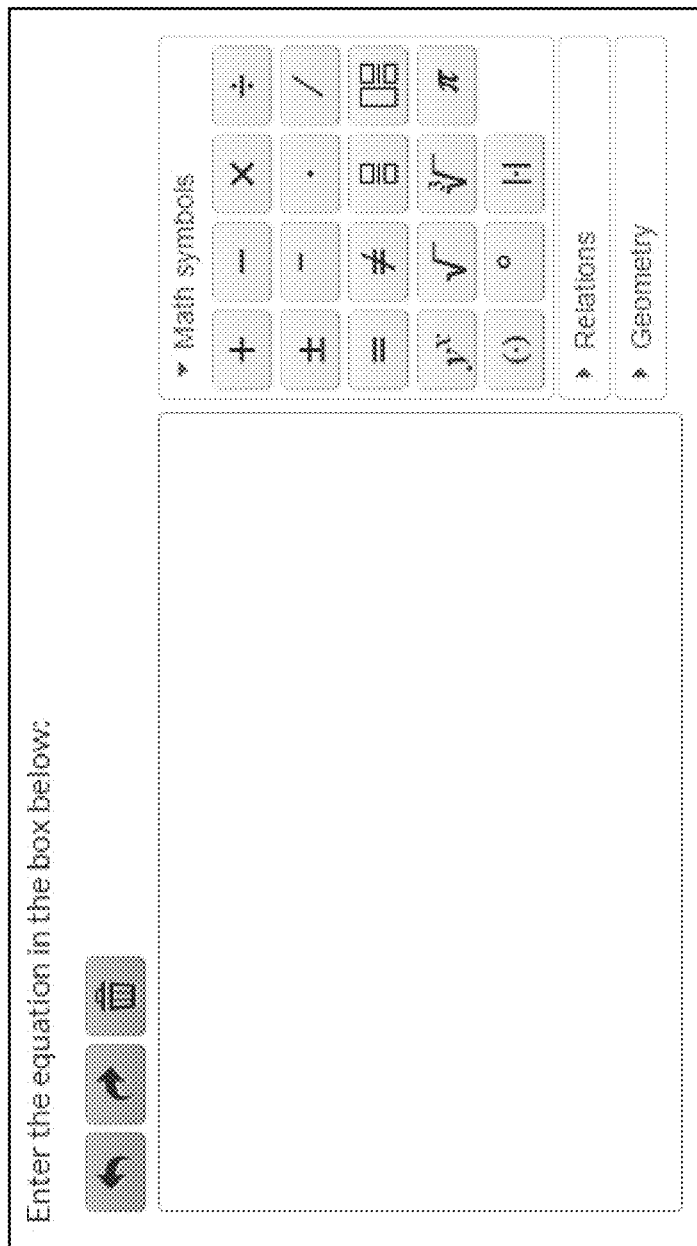

Referring now to FIGS. 9A-9O, additional examples are shown of output from assessment item generator 620 in connection with processes of generating and modifying assessment items. FIGS. 9A-9C show an example of generating a single-part assessment item via a graphical interface provided by an assessment item generator 620. FIG. 9A shows an example of a web-based graphical interface similar to the interface shown in FIG. 8A. Similarly in this example, FIG. 9A includes a first interface region 910 having various selectable assessment component types, and a second interface region 920 representing the assessment item. In this example, a single mathematical equation editor assessment component 921 has been added to the second interface region 920, and thus the current state of the assessment item is a single-part item. FIG. 9B is a graphical presentation view of the single-part item represented in FIG. 9A. FIG. 9C shows the markup language generated by the assessment item generator 620 in response to the input received via the interface of FIG. 9A. In the example of QTI-compliant XML shown in FIG. 9C, it is noted that the markup language data block includes a single responseDeclaration element (line 3), a single outcomeDeclaration element (line 4), and a single variable identifier element (line 14) within the responseProcessing block (lines 12-16).

Figure 9D:
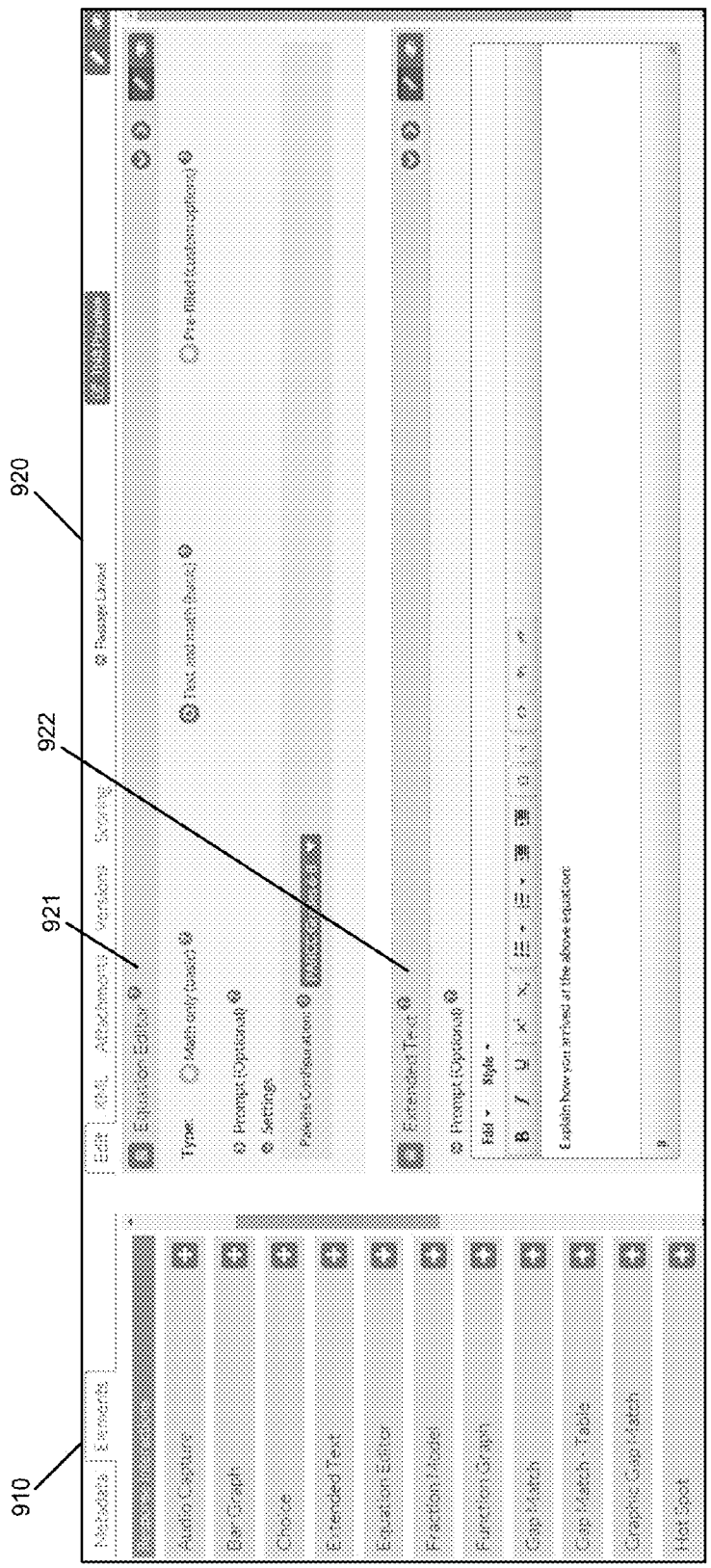
Figure 9E:
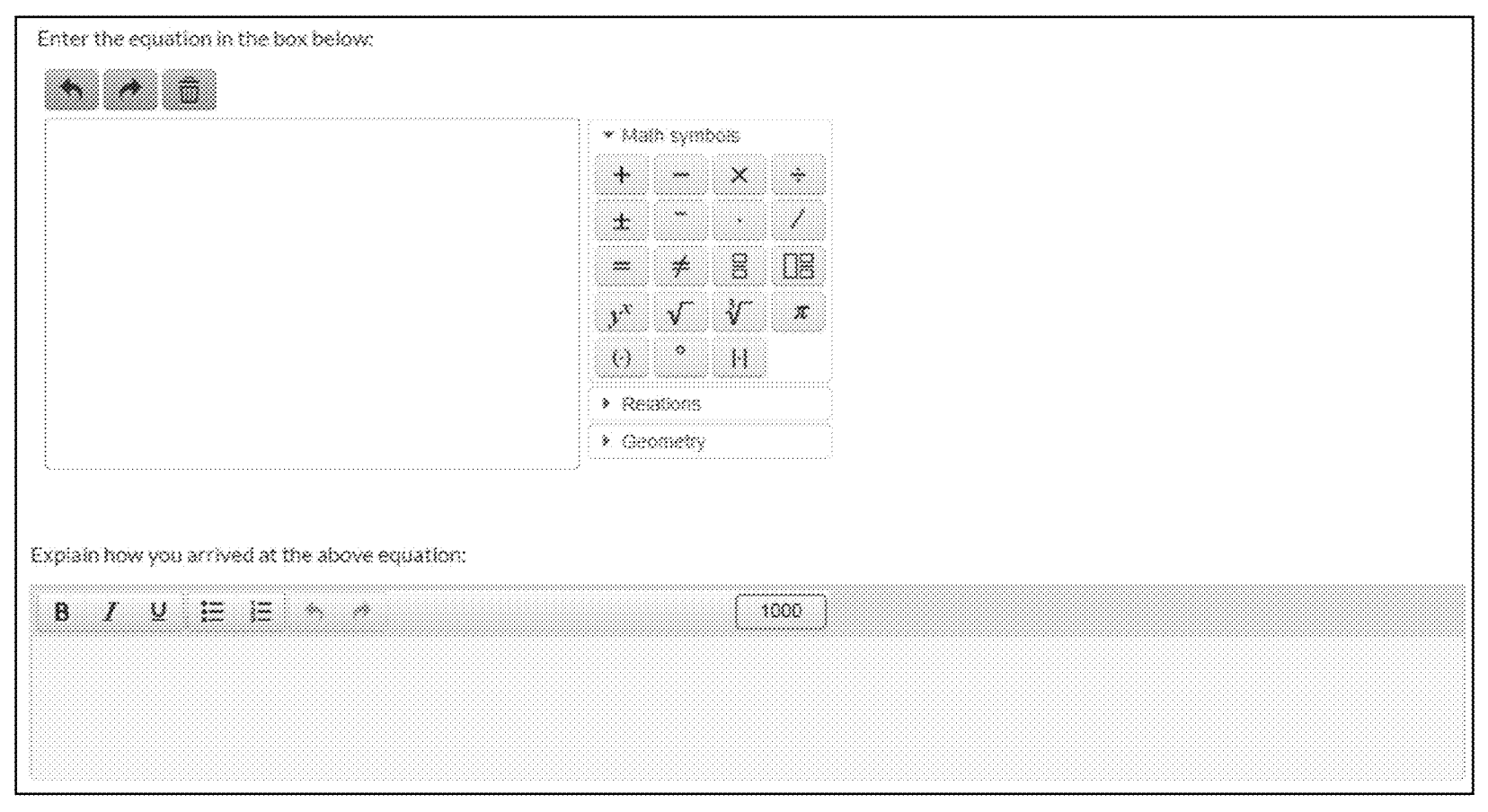

FIGS. 9D-9F continue the example assessment item generation process of FIGS. 9A-9C, and show the addition of a second assessment component to generate a multi-part assessment item. In FIG. 9D, a second assessment component has been added to second interface region 920, making the current state of the assessment item a multi-part item containing the first equation editor assessment component 921 and a second text entry assessment component 922. FIG. 9E is a graphical presentation view of the multi-part item represented in FIG. 9D. FIG. 9F shows the markup language generated by the assessment item generator 620 in response to the input received via the interface of FIG. 9D. In the example of QTI-compliant XML shown in FIG. 9F, it is noted that the single responseDeclaration element in FIG. 9C has been replaced by two responseDeclaration elements (lines 3-4), the single outcomeDeclaration element in FIG. 9C has been replaced by three outcomeDeclaration elements (lines 5-7), and the single variable identifier element in FIG. 9C has been replaced by two variable identifier elements within a sum element (lines 21-24) within the responseProcessing block (lines 19-26). It is also noted that the assessment item generator has renamed certain attributes of these elements (e.g., RESPONSE_A, RESPONSE_B, SCORE_A, SCORE_B) in order to avoid naming conflicts.

Figure 9G:
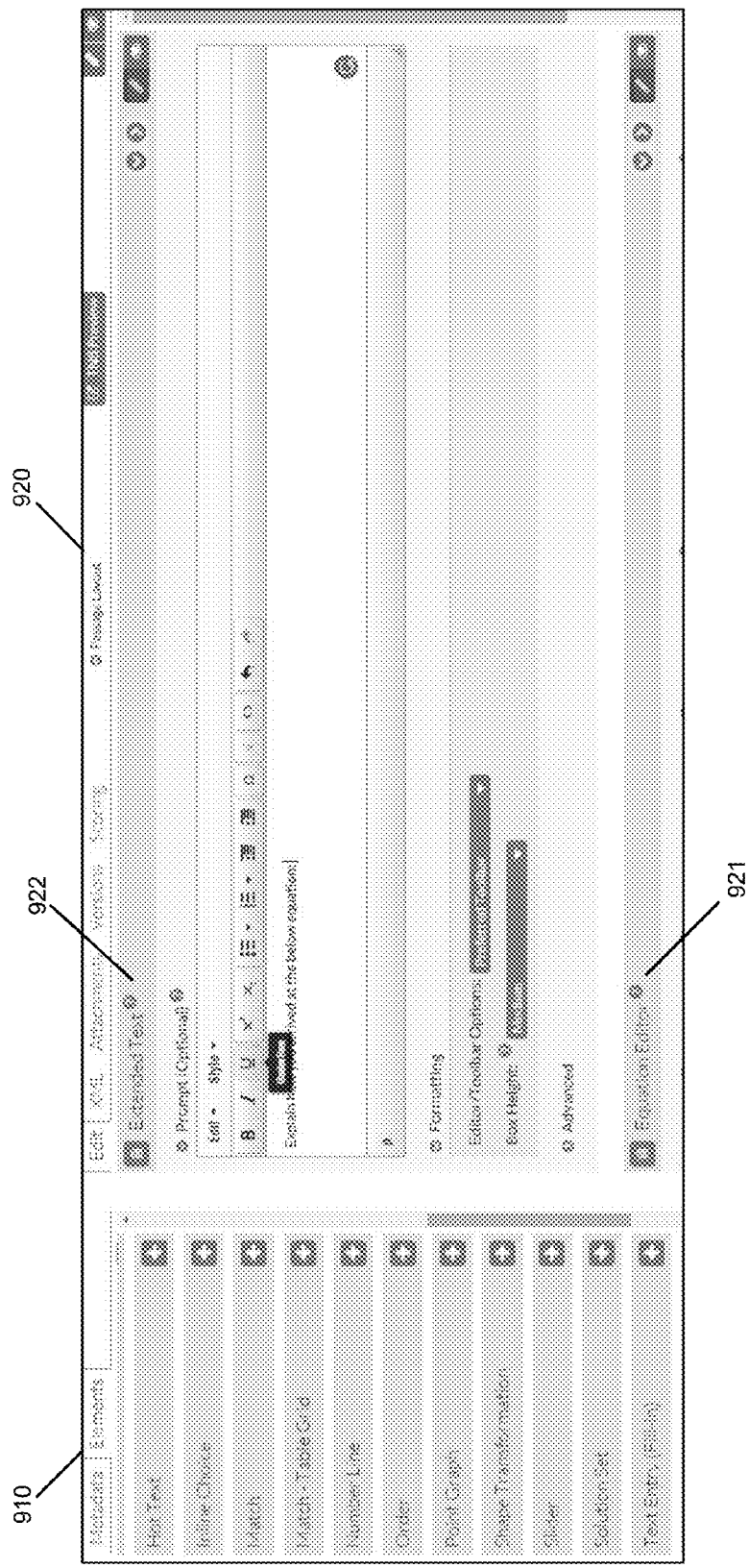
Figure 9H:
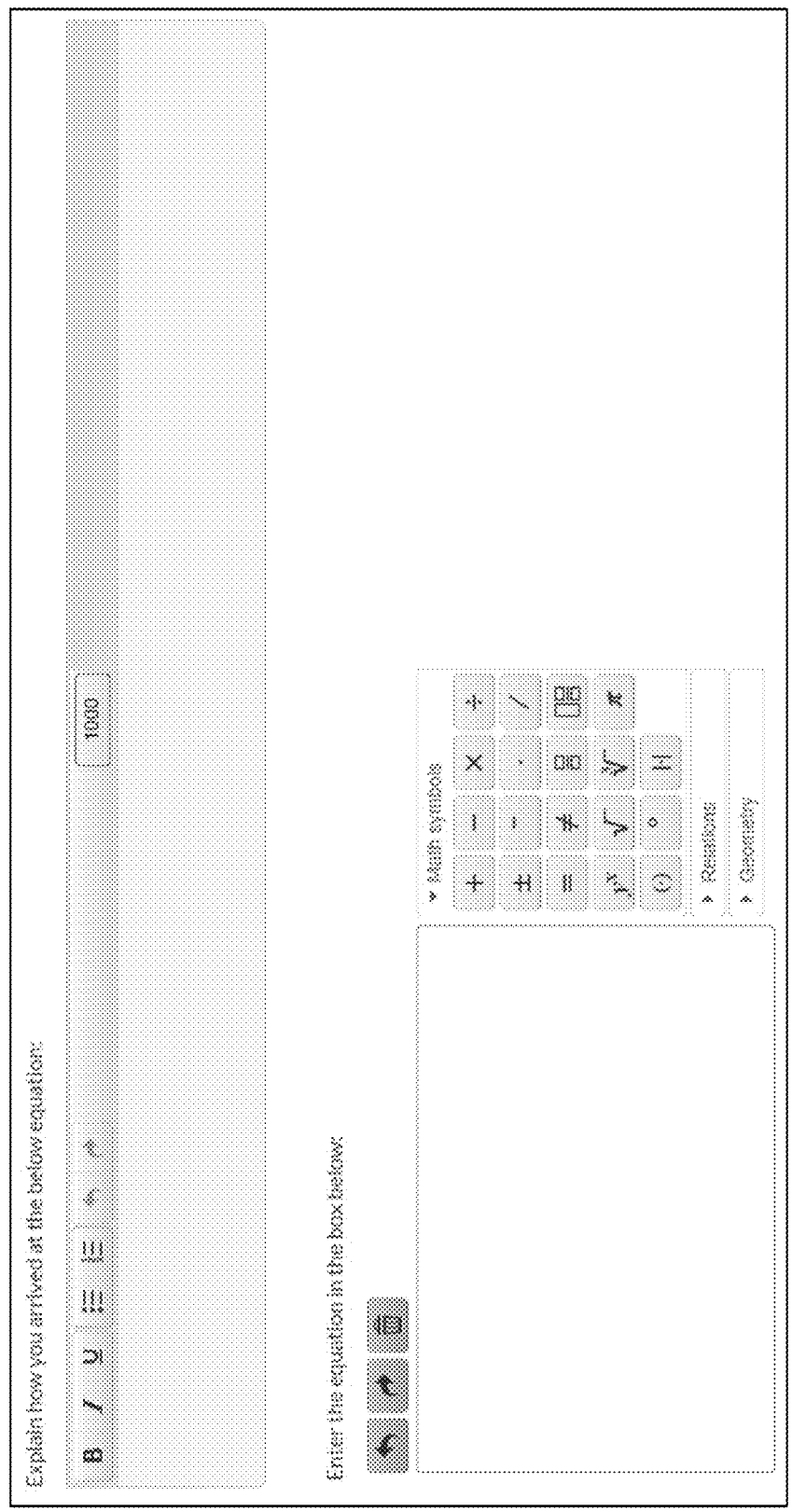

FIGS. 9G-9I continue the example assessment item generation process of FIGS. 9A-9F, and show the modification of the assessment item by switching the positions of the assessment components in the multi-part assessment item. In FIG. 9G, the same assessment components are shown in the second interface region 920, but the relationship of the components has been changed by moving the text entry assessment component 922 above the equation editor assessment component 921 within the interface window 920. FIG. 9H is a graphical presentation view of the updated multi-part item represented in FIG. 9G. FIG. 9I shows the markup language generated by the assessment item generator 620 in response to the input received via the interface of FIG. 9G. In the example of QTI-compliant XML shown in FIG. 9I, it is noted that the single responseDeclaration elements, the outcomeDeclaration elements, and the responseProcessing element are identical to those in FIG. 9F, although the itemBody data block (lines 8-18) has been modified to reflect the new presentation order of the assessment components.

Figure 9J:
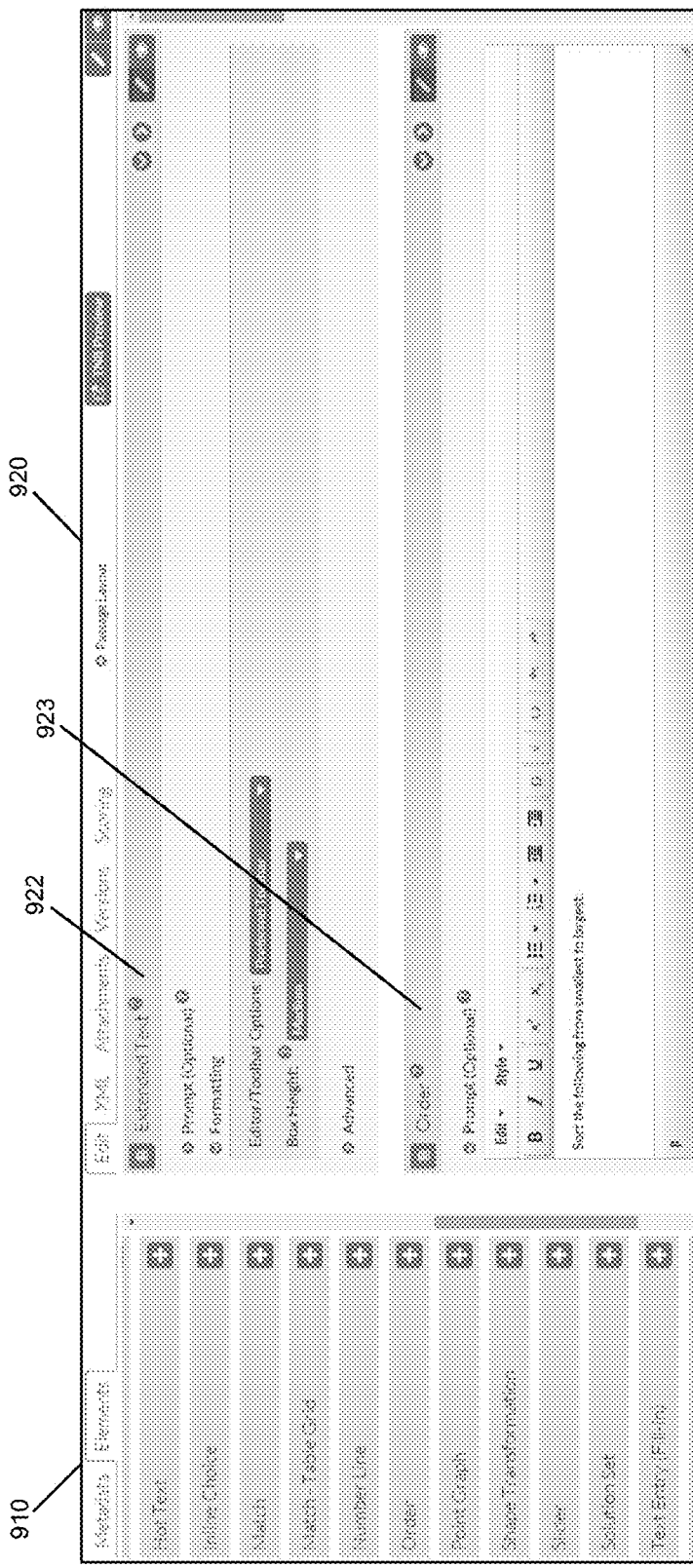
Figure 9K:
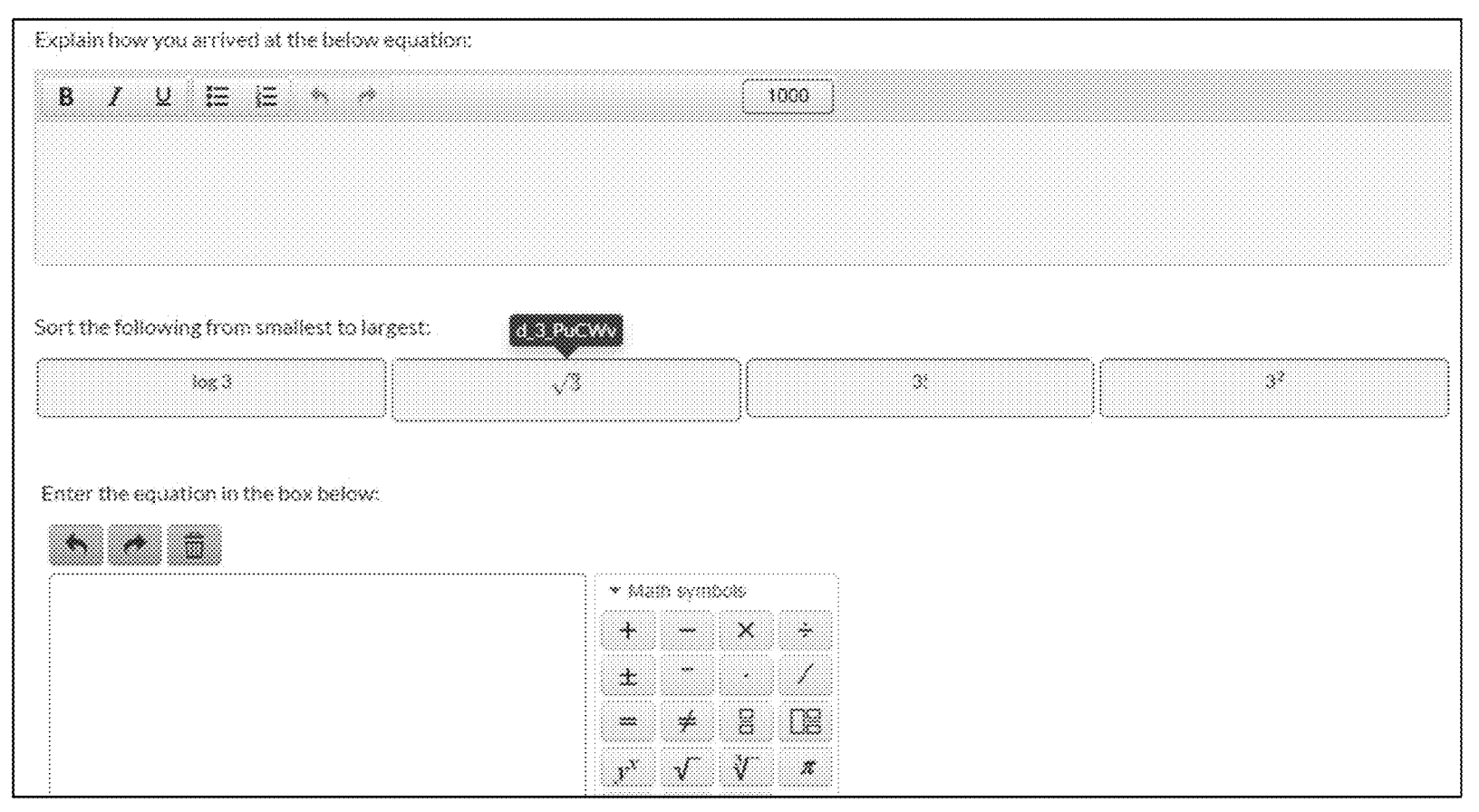

FIGS. 9J-9L continue the example assessment item generation process of FIGS. 9A-9I, and show the addition of a third assessment component within the multi-part assessment item. In FIG. 9J, a third assessment component 923 has been added to second interface region 920, making the current state of the assessment item a multi-part item containing the first equation editor assessment component 921 (not shown), the second text entry assessment component 922, and a third ordering assessment component 923. FIG. 9K is a graphical presentation view of the multi-part item represented in FIG. 9J. FIG. 9L shows the markup language generated by the assessment item generator 620 in response to the input received via the interface of FIG. 9J. In the example of QTI-compliant XML shown in FIG. 9L, it is noted that the two responseDeclaration elements in FIG. 9I have been replaced by three responseDeclaration elements (lines 3-9), the three outcomeDeclaration elements in FIG. 9I have been replaced by four outcomeDeclaration elements (lines 10-13), and responseProcessing block (lines 47-69) has been revised to handle scoring of the updated three-part item.

Figure 9M:
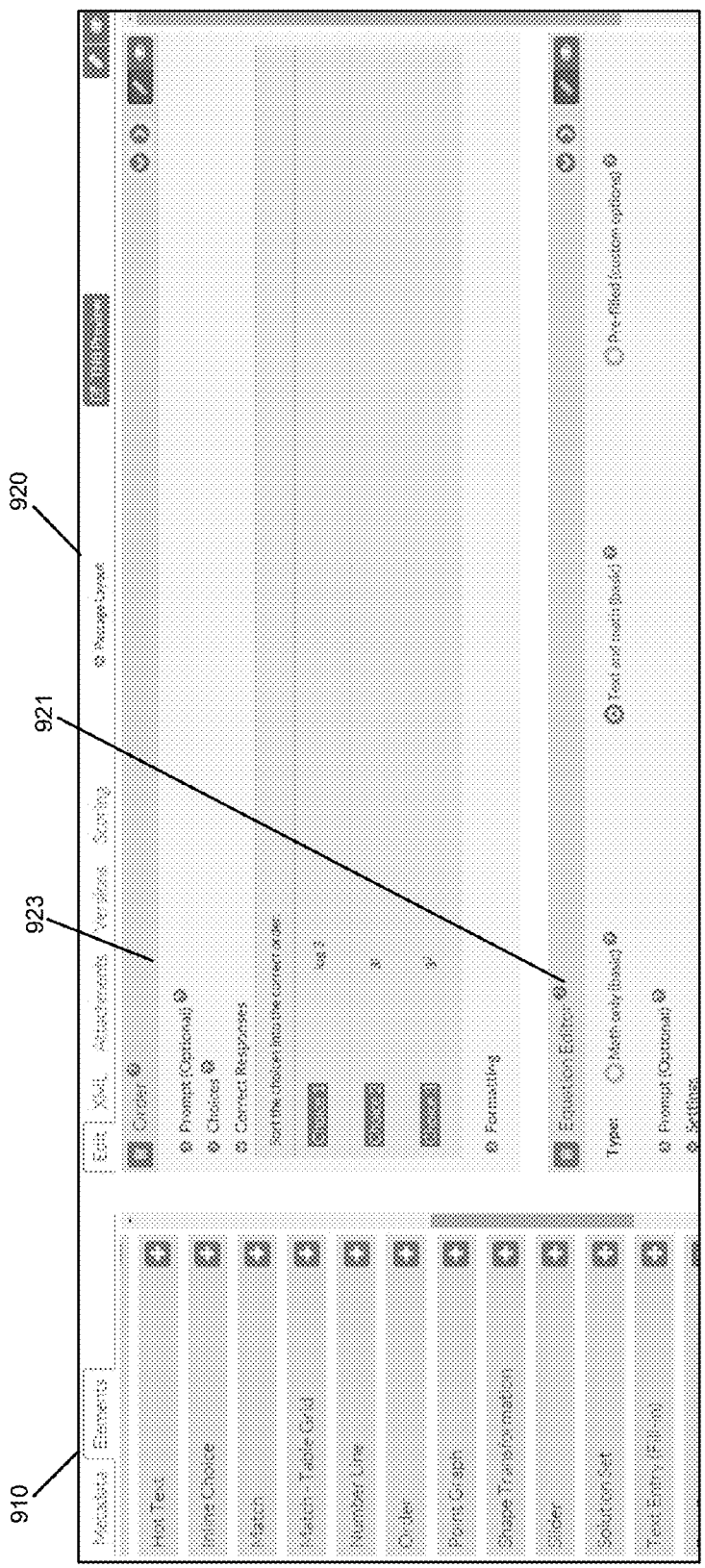
Figure 9N:
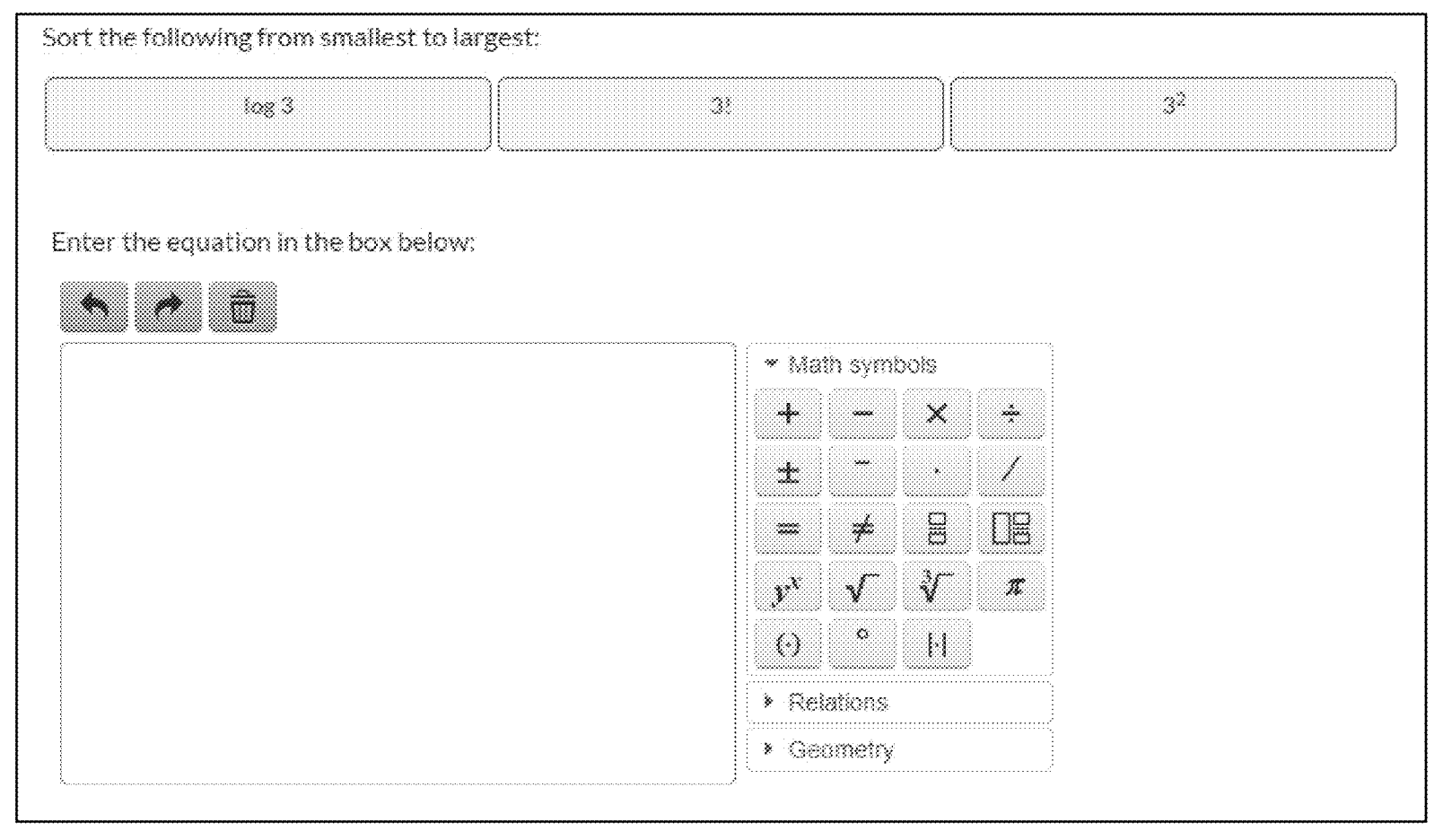
Figure 9O:
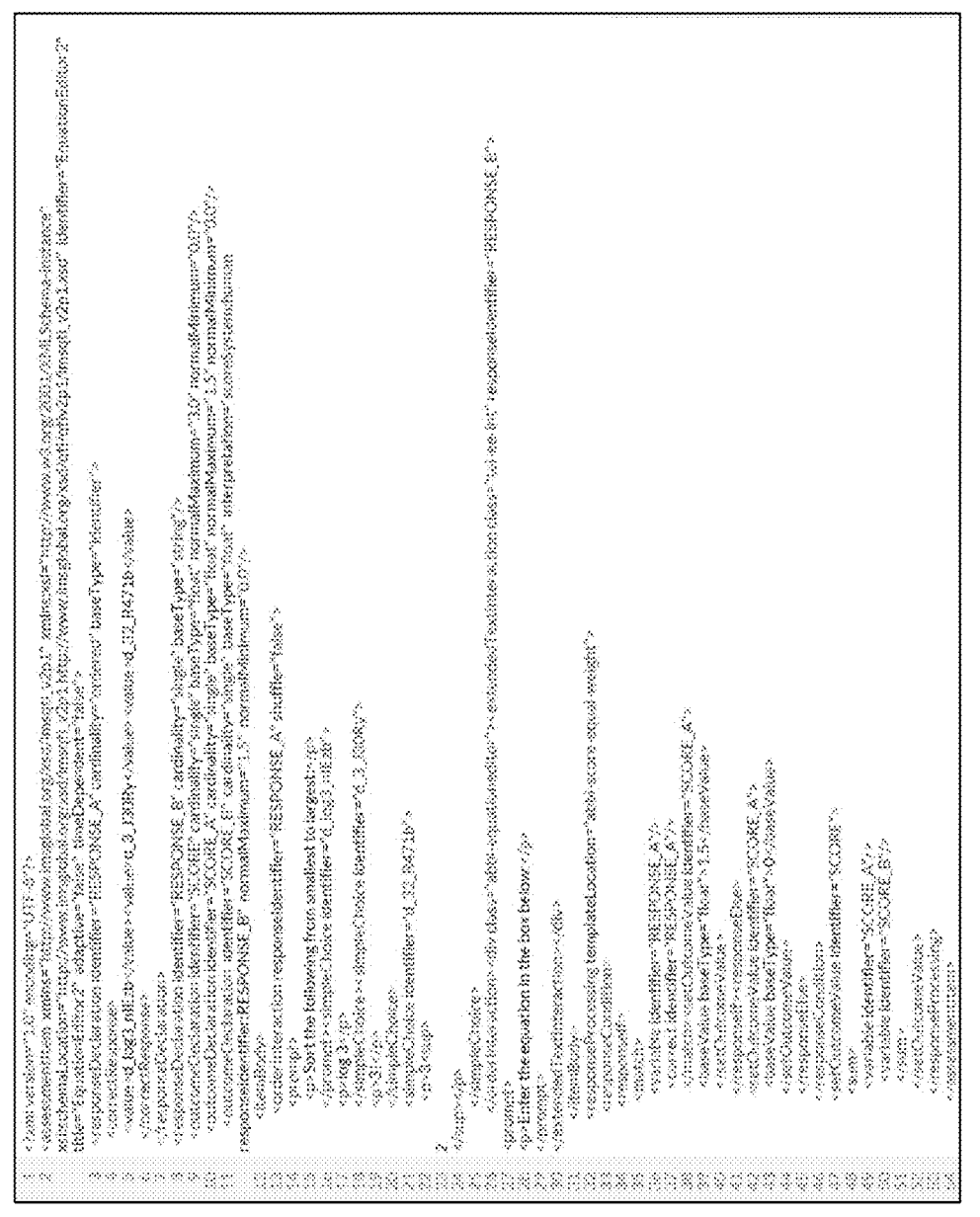

FIGS. 9M-9O continue the example assessment item generation process of FIGS. 9A-9L, and show the removal of an assessment component 922 from the multi-part assessment item. In FIG. 9M, the second text entry assessment component 922 has been removed, making the current state of the assessment item a multi-part item containing the first equation editor assessment component 921 and the third ordering assessment component 923. FIG. 9N is a graphical presentation view of the multi-part item represented in FIG. 9M. FIG. 9O shows the markup language generated by the assessment item generator 620 in response to the input received via the interface of FIG. 9M. In the example of QTI-compliant XML shown in FIG. 9O, it is noted that the responseDeclaration elements, outcomeDeclaration elements, and responseProcessing block (lines 47-69) has been revised similarly to the previous examples to reflect the removal of the second text entry assessment component 922. It is also noted that the assessment item generator has renamed certain attributes of these elements (e.g., RESPONSE_A, RESPONSE_B, SCORE_A, SCORE_B) to correspond to a two-part rather than a three-part assessment item.

Figure 10:
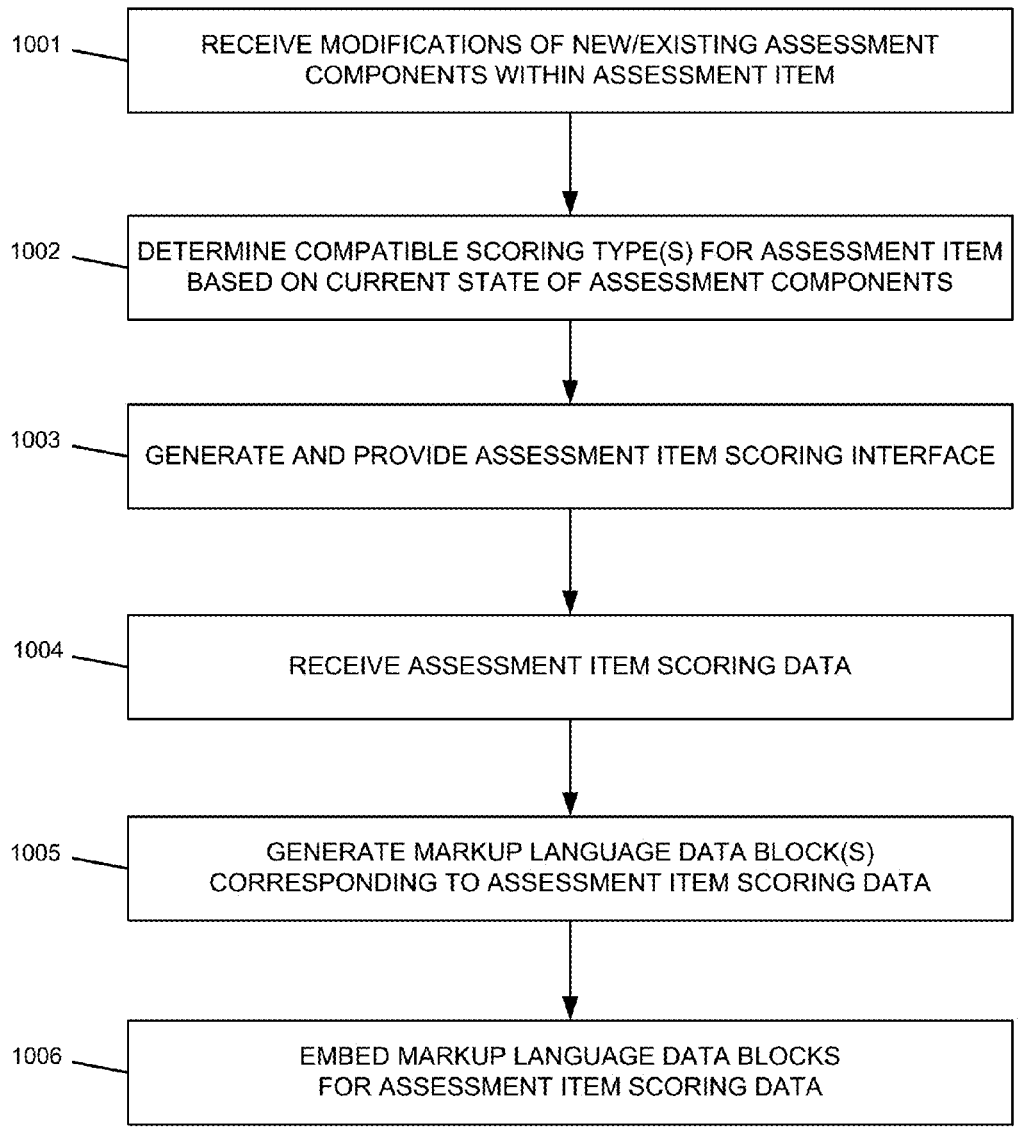
FIG. 10 is a flow diagram illustrating an example process of generating and embedding markup language data blocks corresponding to scoring data for assessment items, according to one or more embodiments of the disclosure.

Referring now to FIG. 10, a flow diagram is shown illustrating a process of generating and embedding markup language data blocks corresponding to scoring data for assessment items. The techniques described below in reference to steps 1001-1006 may be similar or identical to the techniques described above in reference to FIG. 7. Similar to the above examples, FIG. 10 also describes receiving inputs via one or more interfaces corresponding to new assessment items to be generated and/or existing assessment items to be modified, determining the assessment item additions or modifications, and then generating and embedding the corresponding markup language data blocks for the new or modified assessment items. Additionally, the steps in FIG. 10 also may be performed by one or more components in the assessment item generator system 600 described above. For example, each of the steps 1001-1006 may be described below in terms of the assessment item generator 620. However, in other examples, some or all of the steps 1001-1006 described below may be performed on the client side at one or more client devices 610. In still other examples, certain features described below in may be performed by an assessment item publisher 630 and/or assessment item data store 640. It should also be understood that the various features and processes described herein, including receiving scoring-related input data via programmatic or graphical interfaces, and generating markup language data corresponding to assessment item scoring data, need not be limited to the specific systems and hardware implementations described above in FIGS. 1-6.

As noted above, FIGS. 10-11 relate to assessment item scoring. Specifically, FIGS. 10-11 illustrate the use of similar techniques to those discussed above in order to determine compatible scoring types (or scoring methods), receive scoring data from client devices 610 via programmatic or graphical interfaces, and generate markup language data blocks used to implement the scoring logic of assessment items. In some embodiments, assessment item generator systems 600 may include assessment item scoring systems that dynamically assign scoring logic to an assessment item based on the assessment components within the assessment item. QTI, for example, may support the construction of a user response through the concept of modular interactions that encapsulate assessment components (e.g., QTI interactions), such as multiple choice assessment components, drag-and-drop activity assessment components, etc. As noted above, assessment items may include one or more such assessment components. These assessment components may be mapped to scorable responses.

In some cases, the assessment item generator 620 may receive and process the responses constructed by users during execution of assessment items, in order to generate an outcome, or an evaluation of the constructed response. The assessment components (e.g., QTI interactions) and response processing may be distinct elements that are abstracted from one another, so that response processing may be loosely coupled and templated in a scoring template library 626. For example, a multiple choice question with a correct answer or answers may be processed via a uniform response processing template that maps to specific data in an interaction and its response declarations. However, in some embodiments, certain assessment items can be scored in multiple different ways. For example, multi-part items may weigh the value of their parts the same or differently, and may or may not award partial credit. Interactions that support complex responses to assessment items may require complex logic to process those responses. Additionally, in some cases, assessment components such as essay questions may require scoring by a human or an external service. In such cases, the response processing of the assessment item may indicate where and how the item should be routed for scoring.

In order to address the challenges of implementing scoring for assessment items, the assessment item generator 620 may be configured to collect data regarding QTI interactions and serialize that data as QTI-compliant XML and JavaScript Object Notation (JSON). The assessment item generator 620 and/or client devices 610 also may maintain a dynamic scoring model, for example, using JavaScript to implement logic in the web browser application that is responsible for assigning correct response processing to an assessment item, based on the current state of the item, the state of its interactions, and the user's score processing choices. In such cases, when an item is updated, the scoring model may check the assessment item model for the number of interactions, the correct responses declared for those interactions, and the scoring approaches the assessment item author/creator prefers. For example, a graphing assessment component might be scored by exact points set by the student, or by an equation that captures those points. The scoring model may access a number of response processing templates 626, which may be selected depending on assessment item conditions, and then populated with data specific to that item.

As noted above, certain assessment items with the same data may be scored in more than one way. Accordingly, the assessment item generator system 600 may provide scoring interfaces (e.g., graphical interfaces 11B, 11E, 11G, 11I, etc.) to allow users to view the current scoring types/templates chosen, and to adjust the overall scoring of the assessment item, for example, by choosing to award or not award partial credit for a multi-part item. As described below, because the scoring model provided by the assessment item generator 620 may be dynamic, the user may be presented only with those scoring choices that are appropriate for the current state of the assessment item.

In step 1001, the assessment item generator 620 may receive input from a client device via an interface corresponding to modifications of an assessment item. The data received in step 1001 may be similar or identical to the data received in steps 703 and/or 704, discussed above. For instance, a user may interact with a graphical interface or programmatic interface to contrast or modify an assessment item by adding a new assessment component, modifying an existing assessment component, removing an assessment component, changing the relationships between assessment components, and the like.

Additionally, as noted above, the process illustrated in FIG. 10 relates to scoring of assessment items. Accordingly, the data received in step 1001 potentially may include user identifications of the correct responses for the various assessment components within an item. When constructing assessment items, the content creators/authors may be responsible for specifying the correct responses to questions and other types of assessment components. In some cases, correct responses may be singular correct responses, such as answer "A" for a multiple choice assessment component. In other cases, multiple options may exist for specifying a correct response. As an example, for a point graph assessment component, a content creator/author could choose between the following to define a correct response: (a) a definition of the certain exact points that must be plotted by the user to receive credit for a correct response, (b) a determination that any two points that create a line with a slope of a specified value receive credit for a correct response, or (c) a determination that any points that are true for a particular equation will receive credit for a correct response.

Additionally if the user consuming the assessment item (e.g., a test-taker, evaluator, etc.), can select other options such whether the line is dotted or solid, then specifying which of these should have been chosen by the test-taker will also be a part of the correct response. With a function graph assessment component type, it may be possible that not only should the points plotted be true for a certain equation but certain other aspects of the graph must be correct, such as the midline or asymptote, in order for the user to receive credit for a correct response.

In some embodiments, when multiple correct responses are possible for an assessment component, the data received in step 1001 may include a listing of each possible correct responses, or may specify logic by which responses should evaluated to determine whether they are correct. For instance a point graph assessment component may support score-by-slope and score-by-equation scoring types/methods for evaluating answers. As another example, a hot spot assessment component may support score-by-value-mapping for evaluating answers. In such examples, each hot spot may be mapped to a value, and the values for any hot spots selected by the user are added up and compared to a sum provided as the correct response.

For embodiments in which QTI-compliant XML is generated and stored to represent assessment items, the correct response to assessment components (or QTI interactions) will generally be found inside the responseDeclaration element, within an element named correctResponse. Multiple <value> nodes inside the correctResponse element may indicate a QTI interaction that has multiple components, such as a graphic gap match interaction with multiple draggers and multiple drop bays. Multiple responseDeclaration elements may indicate a multi-part item. As discussed above in reference to FIGS. 7-9, multi-part items may identify different parts within the QTI-compliant XML as "RESPONSE_A," "RESPONSE_B," . . . , "SCORE_A," SCORE_B," . . . , etc. In other cases, for an inline choice or text entry assessment item having multiple pulldown menus or blanks, the assessment item XML may include multiple responseDeclaration elements with naming conventions of RESPONSE_A1, RESPONSE_A2, . . . , etc.

In step 1002, the assessment item generator 620 may determine one or more compatible scoring types (or scoring methods) based on the data received in step 1001 and the current state of the assessment components. For example, certain types of assessment components (e.g., specific QTI interaction classes) may have only a single valid scoring type, while other assessment component types may have multiple potential scoring types. Additionally, in some cases, certain scoring types such as unequal weight scoring, no partial credit scoring, and the like, may be compatible only with assessment items having multiple assessment components. Thus, for single-part assessment items, these scoring types may not be available. The following list of illustrative scoring types and descriptions may, in some embodiment, correspond to the determination in step 1002 of compatible scoring types for assessment items. However, it should be understood that this list is illustrative only and non-limiting, and that different scoring types and different compatibility criteria for scoring types may be used in other embodiments based on the scoring framework described herein.

Scoring Types
Item-Level Scoring Types
Equal Weight Scoring—In the Equal Weight Scoring Type (or Method), the total number of points for the assessment item, which defaults to 1 but can be changed by the user, is divided equally between item parts (e.g., assessment components). Each assessment component may use all-or-nothing scoring. An assessment component may be defined as a QTI interaction, even though that interaction may have multiple parts: multiple inline choices, multiple draggers, multiple text entry blanks, etc. In some embodiments, the Equal Weight Scoring Type may be default scoring type (or method). It may apply to any combination of interactions within a single assessment item.

1 Part Accuracy/1 Part Evidence—The 1 Part Accuracy/1 Part Evidence scoring type may be compatible only with two multiple-choice interactions within one item. This scoring type may default to 2 total points. One point may be awarded for a correct response to the first interaction. The second point may be only awarded if the both parts are correct. No points may be received for a correct response to the second interaction if the first interaction is incorrect. The 1 Part Accuracy/1 Part Evidence scoring type may be compatible with any of the following types of assessment components within a two-part assessment item: choice assessment components, gap match and gap match table assessment components, graphic gap match assessment components, hot spot assessment components, hot text assessment components, inline choice assessment components, match assessment components, match table assessment components, and text extractor assessment components.

Unequal Weight Scoring—In the Unequal Weight Scoring type, the total number of points for an assessment item may be distributed unequally across assessment components (e.g., QTI interactions). The total number of points may default to the total number of assessment components, with one point initially assigned to each assessment component. The user may change the number of points associated with each part, which will in turn update the total number of points for the assessment item.

No Partial Credit—In the No Partial Credit scoring type, the total number of points may be changed by the user and all parts of the multi-part assessment item must be answer correctly. If any part is incorrect, then the user (e.g., test-taker) receives no points.

1 Part TECR Grouping (2-pt partial credit)—In this scoring type, when there is just one assessment components but it is an assessment component that involves multiple selections as part of a response (e.g., multiple draggers, multiple hot spots, etc.), a partial credit model referred to as TECR may be used.
   2 points awarded if all selections are correct
   1 point awarded if at least half of the selections are correct
   0 points if less than half of the selections are correct This scoring type may be applicable to the following assessment component: Hot Spot (when scored by exact match), Gap Match, Gap Match Table, Graphic Gap Match, Hot Text, Match, Match Table, and Text Extractor.

1 Part TECR Constrained (2-pt partial credit)—This scoring type implements scoring logic similar to the 1 Part TECR Grouping scoring type, and is available for inline choice assessment component when inline choice is the only assessment component and it has more than one drop-down.
   2 points awarded if the selections on all the drop-downs are correct
   1 point awarded if at least half of the selections on the drop-downs are correct
   0 points if less than half of the selections on the drop-downs are correct 1 Part TECR Order (2-pt partial credit)—The scoring type is applicable to the following assessment components: Gap Match or Gap Match Table, Graphic Gap Match, Match, and Text Extractor. When there is just one assessment component, but it is an assessment component that may involve dragging multiple objects (images or text) as part of a response, a partial credit model referred to as TECR may be used to consider the spatial order of the draggers in a response.
   2 points awarded if all selections are correct
   1 point awarded if more than half the selections are placed in the correct order
   0 points if less than half of the selections are placed in the correct order This scoring is applicable to the following item interactions: Gap Match or Gap Match Table, Graphic Gap Match, Match, and Text Extractor Hot Spot Scoring Types Exact Match—In the Exact Match Scoring Type, all-or-nothing credit for an assessment component is based on whether the user (e.g., test-taker) selects all hot spots that are indicated as correct and no hot spots that are not indicated correct. Each hot spot may have a checkbox used to indicate whether should be considered a correct hot spot for scoring purposes.

Map to Value—In this scoring type, each hot spot may be mapped to a value. Each hot spot can be mapped to the same value (and an interface feature is provided to map all hot spots to the same value, although those values can still be edited) or to different values. The correct answer may be expressed as a sum. In order for a test-taker to receive all-or-nothing credit for this assessment component, the sum of the values for each test-taker selected hot spot must equal a specific number. This can be used when a total of 10 hot spots, all mapped to a value of 1, must be selected but which ones are selected matters not. In another scenario, with an assessment component where a maximum of two hot spots may be selected and where there are three pairs of hot spots that could be considered correct if chosen together, then the correct response could be 10, with one pair having values of 1 and 9, another 2 and 8, and a third 3 and 7.

Text Entry Scoring Types

All Text—In the All Test scoring type, text entry boxes within the same assessment component may use different methods for specifying the correct response, but all-or-nothing scoring is used. If this is not desirable, assessment item authors may include each text entry box in a separate assessment component.

Exact String Match—In this scoring type, in order for a user (e.g., test-taker) response to be considered correct, what is typed in the box must match the correct response character for character.

Number—This scoring type for specifying the correct response may be appropriate for use only when the character that may be typed are restricted to numbers and basic math characters. The presence of leading and trailing zeroes or an unnecessary decimal points may be ignored. Additionally, the assessment item author may choose whether commas, if used, are ignored or whether they must be in the correct location in order to be considered correct Exhaustive List—In this scoring type, multiple responses can be considered correct using the Exhaustive List option. Exhaustive list may use Score by Number with commas ignored. Fraction bars may be used to indicate a correct response.

Point Graph Scoring Types

All—In this scoring type, a point graph assessment component may have multiple graphs with each being of a different type (e.g., point, continuous line, line segment, polygon, etc.). Each graph may have its own correct response. The options available for specifying the correct response may vary by graph type. Additionally, if an assessment item author wants to provide an option for toggling the line style between dotted and solid, the author will need to specify which line style should be used for a response to be considered correct.

Point—In this scoring type, the user (e.g., test-taker) must plot each point specified and no additional points. This type of scoring is available for point, line segment, and continuous line.

Equation—In this scoring type, the points plotted by the user (e.g., test-taker) must be true for a given equation. Three pieces of information must be provided when creating a graph assessment component that is scored by equation: (1) the equation (2) the number of points that must be correctly plotted to be considered correct (3) sample points. This type of scoring is available for point, line segment, and continuous line.

Polygon—In this scoring type, the user (e.g., test-taker) must plot each point specified as part of the correct response and no additional points. Two pieces of information must be provided when creating a polygon graphing interaction: (1) the points that the test-taker must plot (2) whether the shape should be open or closed.

Slope—In this scoring type, the line created by the two points plotted by the user (e.g., test-taker) must have a slope that matches the correct response. If fewer or more than two points are plotted, then the item is considered incorrect, even if a line is created from one pre-plotted point and a test-taker plotted point with the connect-to-preplot option turned on. Two pieces of information must be provided when creating a graph assessment component to be scored by slope: (1) the slope (2) sample points. This type of scoring is available for point, line segment, and continuous line.

Bar Graph Scoring Types

Match—In this scoring type, bar graphs, with or without clusters, may be scored based on whether the user (e.g., test-taker) placed the bar graph at a height that matches the correct value for that bar. Uneditable bars do not have a correct value associated with them.

Fraction Model Scoring Types

Exact Match—In this scoring type, for all-or-nothing credit, each fraction model within the assessment component must be divided into the number of segments indicated by the denominator of the correct response. The number of selected segments must equal the number indicated by the numerator of the correct response. Uneditable fraction models do not have a correct response associated with them.

Equivalent Fraction—In this scoring type, for all-or-nothing credit, each fraction model within the assessment component must represent a fraction that can be considered equivalent to the correct response. Uneditable fraction models do not have a correct response associated with them.

Function Graph Scoring Types

Equation—In this scoring type, function graphs are scored by equation and by correct function type. Sample points must always be provided. Some function types may require additional information:

Exponential—requires the Asymptote Value

Tangent/Cotangent—requires Midline Value and Quarter Period Value

Absolute Value—requires the x and y value of the Vertex Point

Logarithmic—requires the Asymptote Value

Quadratic—requires the x and y value of the Vertex Point

Sine/Cosine—requires Midline Value and Quarter Period Value.

In step 1003, the assessment item generator 620 may provide an assessment item scoring interface based on the determination of the compatible scoring types in step 1002. The provided assessment item scoring interface may include graphical (e.g., web-based) and/or programmatic (e.g., APIs) interface components, which may be available to users at client devices 610. Providing the interface to client devices 610 in step 1003 may be performed using similar or identical techniques as providing the interfaces to client devices 610 in steps 703, 704, and 1001, described above. However, the interface components provided in this step may be configured specifically to receive scoring data, rather than selections and general modifications of assessment components, as described previously. For example, the assessment item generator 620 may provide graphical and programmatic interfaces configure to illicit and receive scoring type selection, score values for assessment components, relationships and scoring dependencies between assessment components, and any other scoring data described in the example scoring types above. Examples of graphical interfaces generated in accordance with some embodiments are shown in FIGS. 11B, 11E, 11G, 11I, discussed in more detail below.

Additionally, in some cases, graphical or programmatic interfaces provided to user devices 610 may include additional options for allowing users to specify an amount of tolerance that should be exercised when evaluating a response for correctness. For example, the correct answer to a fraction model assessment component may be ⅓, but additional information must be provided in order to allow additional tolerance for equivalent fractions such as ⅖ and ⅜ to be considered correct. Similarly, for a text entry assessment component, the correct response might be 2000, but additional instructions must be provided in order to consider 2,000, 20,00, 2000/1, 02000, and 2000.00 as correct. Alternatively, the interface may allow users to specify that equivalent values (e.g., ⅖ rather then ⅓, or 2000.00 rather than 2000) should not be credited as correct responses. These types of specialized rules and tolerances for considering a response to be correct are typically found in the responseProcessing XML element.

In step 1004, the assessment item generator 620 may receive assessment item scoring data from the client device 610 via the interface provided in step 1003. The assessment item scoring data received in step 1004 may correspond to the interface components provided to the user in step 1003. Examples of assessment item scoring data that may be received in step 1004 include user selections of one or more scoring types from a plurality of compatible scoring types, assignments of point values to various assessment components, and data specifying relationships and scoring dependencies between the various assessment components within the item.

In step 1005, the assessment item generator 620 may generate one or more data objects corresponding to the scoring assessment item scoring data received in step 1004, and/or any scoring assessment item scoring data determined previously in step 1002. In some embodiments, the data objects generated in step 1005 may be markup language data blocks, for instance, QTI-compliant XML blocks. The markup language encoding and generation techniques used by the assessment item generator 620 in step 1005 may be similar or identical to those discussed above in reference to step 705. However, the markup language generation process in step 1005 may be used for scoring data for assessment items, rather than for general assessment item data.

In embodiments in which QTI-compliant XML is generated, the assessment item scoring data may be stored within the assessment item XML encoding in one of four locations: the responseDeclaration XML blocks/elements, the outcomeDeclaration XML blocks/elements, the templateDeclaration XML blocks/elements, and/or the responseProcessing XML blocks/elements. Accordingly, the markup language data block generation performed in step 1005 may generally include constructing and/or modifying data blocks corresponding one or more of these four XML elements.

Figure 11A:
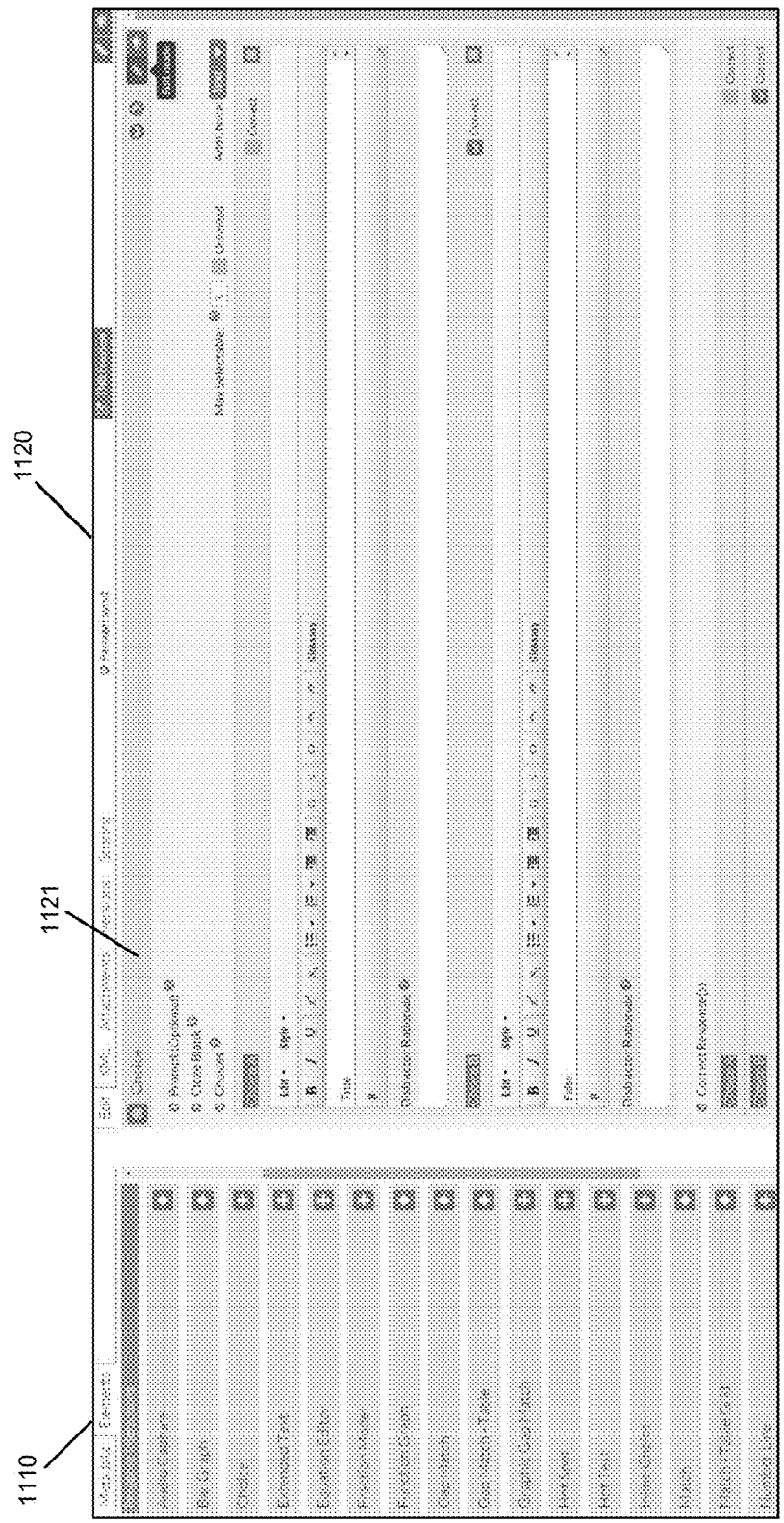
Figure 11B:
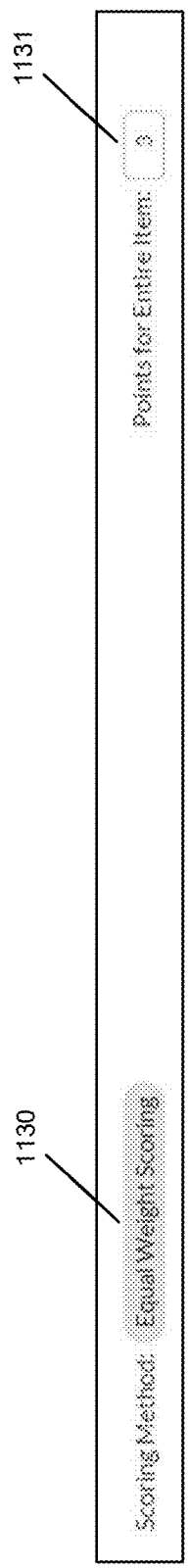
Figure 11C:
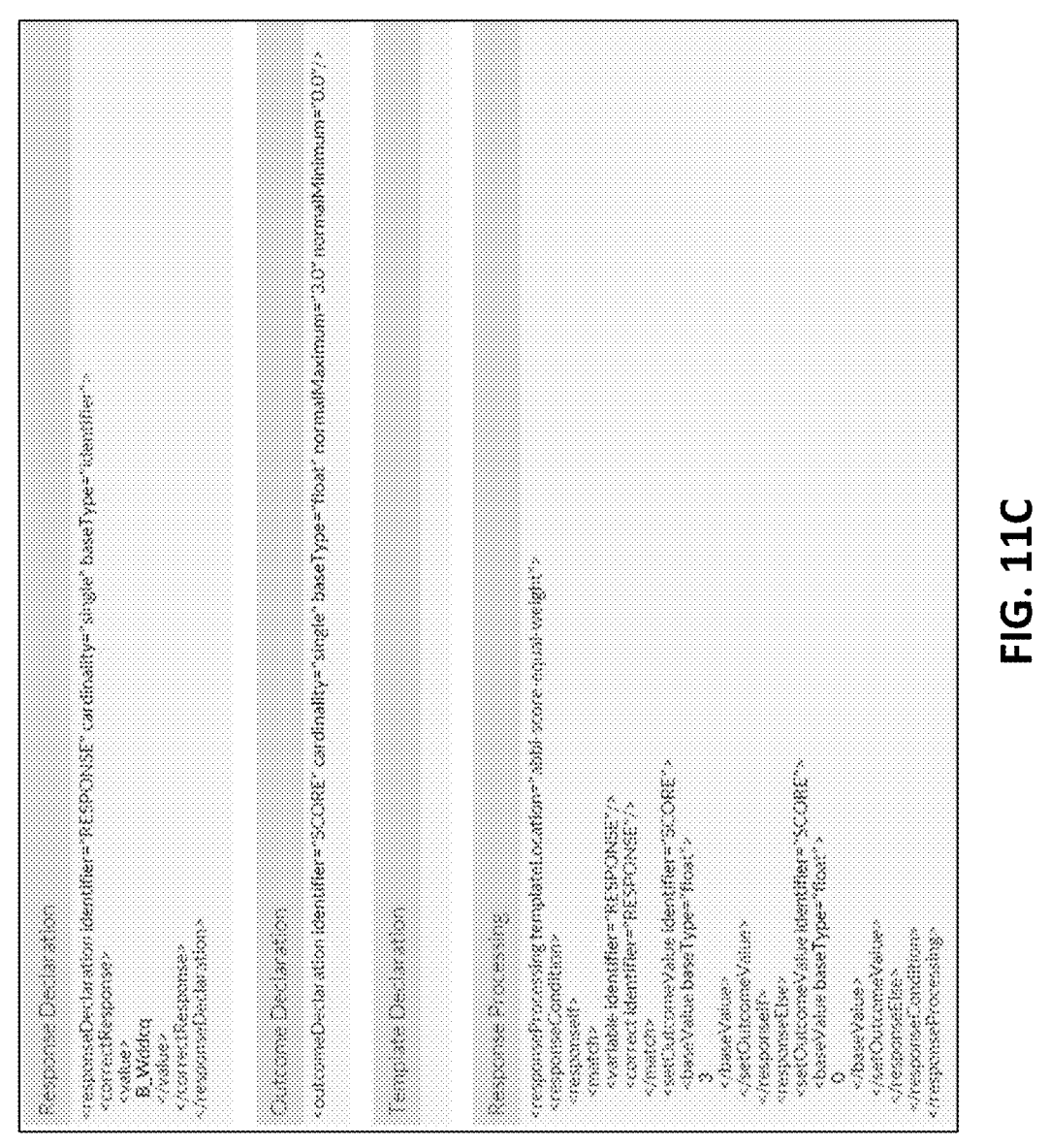

Referring now to FIGS. 11A-11K, several examples are shown of output from assessment item generator 620 in connection with processes of generating scoring data for assessment items. FIGS. 11A-11C show an example of defining the scoring logic and/or scoring parameters for a single-part assessment item via a graphical interface provided by an assessment item generator 620. FIG. 11A shows an example of a web-based graphical interface similar to the interface shown in FIGS. 8A and 9A. Similarly in this example, FIG. 11A includes a first interface region 1110 having various selectable assessment component types, and a second interface region 1120 representing the assessment item. In this example, a single multiple choice assessment component 1121 has been added to the second interface region 1120, and thus the current state of the assessment item is a single-part item. FIG. 11B is a graphical presentation of an assessment item scoring interface generated specifically for the single-part item shown in FIG. 11A. Referring to FIG. 11B, based on the number of assessment components currently in the assessment item (i.e., 1), and based on type of the assessment component 1121, only the Equal Weight Scoring type 1130 (or scoring method) is available for scoring the assessment item in its current state. Thus, the user may not select any other scoring type in this example, but may change the point value for the assessment item in box 1131. FIG. 11C shows the markup language generated by the assessment item generator 620 in response to the input received via the interface of FIGS. 11A and 11B. In the example of QTI-compliant XML shown in FIG. 11C, it is noted that the assessment item generator 620 has constructed three separate markup language data blocks, a responseDeclaration XML element block, an outcomeDeclaration XML element block, and a responseProcessing XML element block. These data blocks define, among other things, the correct response for the choice assessment component, and the point value for the assessment item. As discussed below, these markup language data blocks may be embedded, together or separately, into one or more QTI-compliant XML assessment items, in order to define and control the scoring logic and parameters for the assessment item.

Figure 11D:
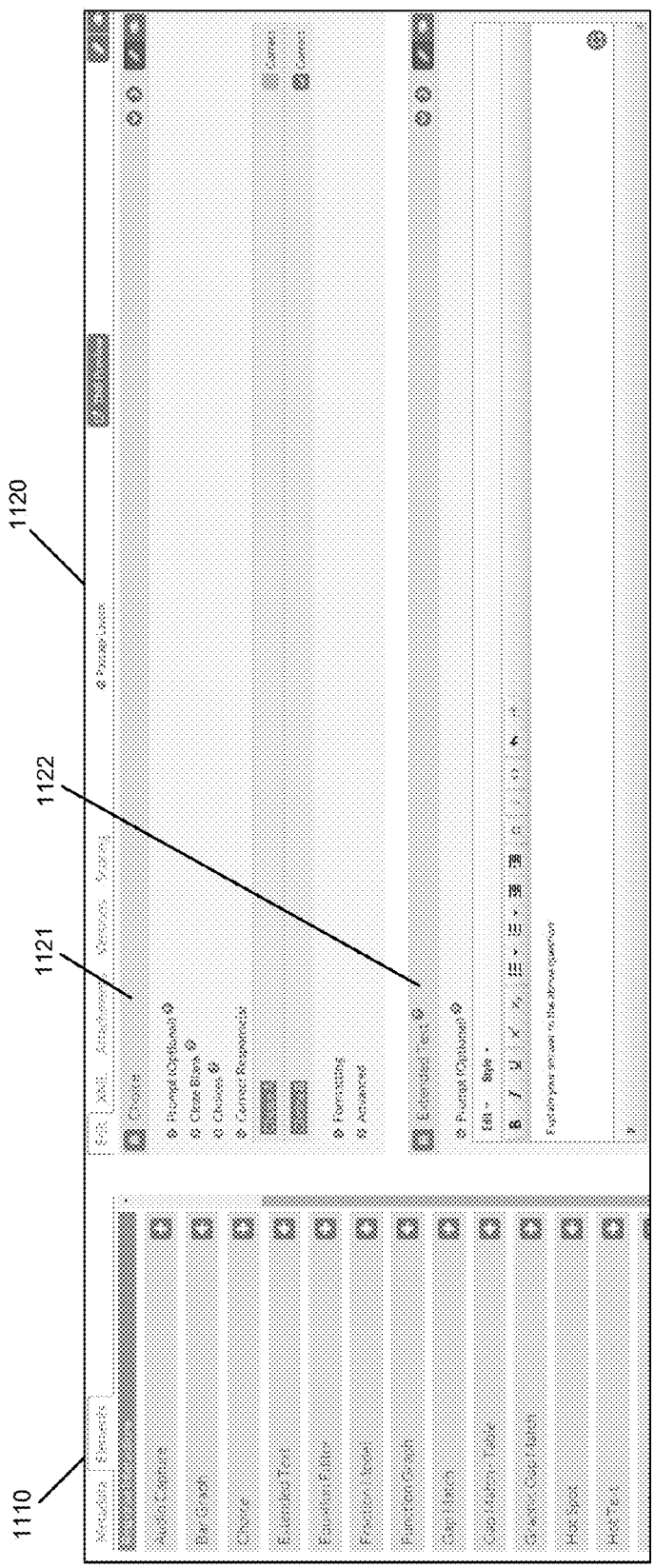
Figure 11E:
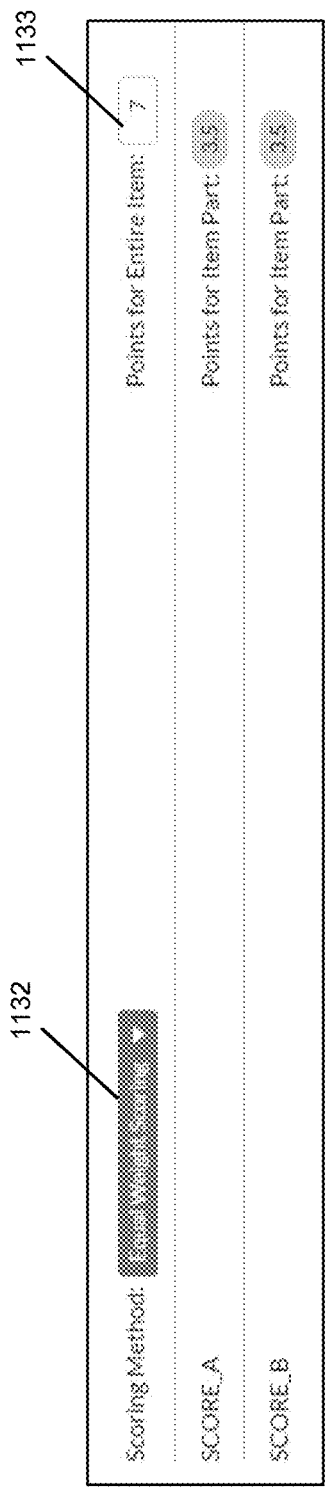
Figure 11F:
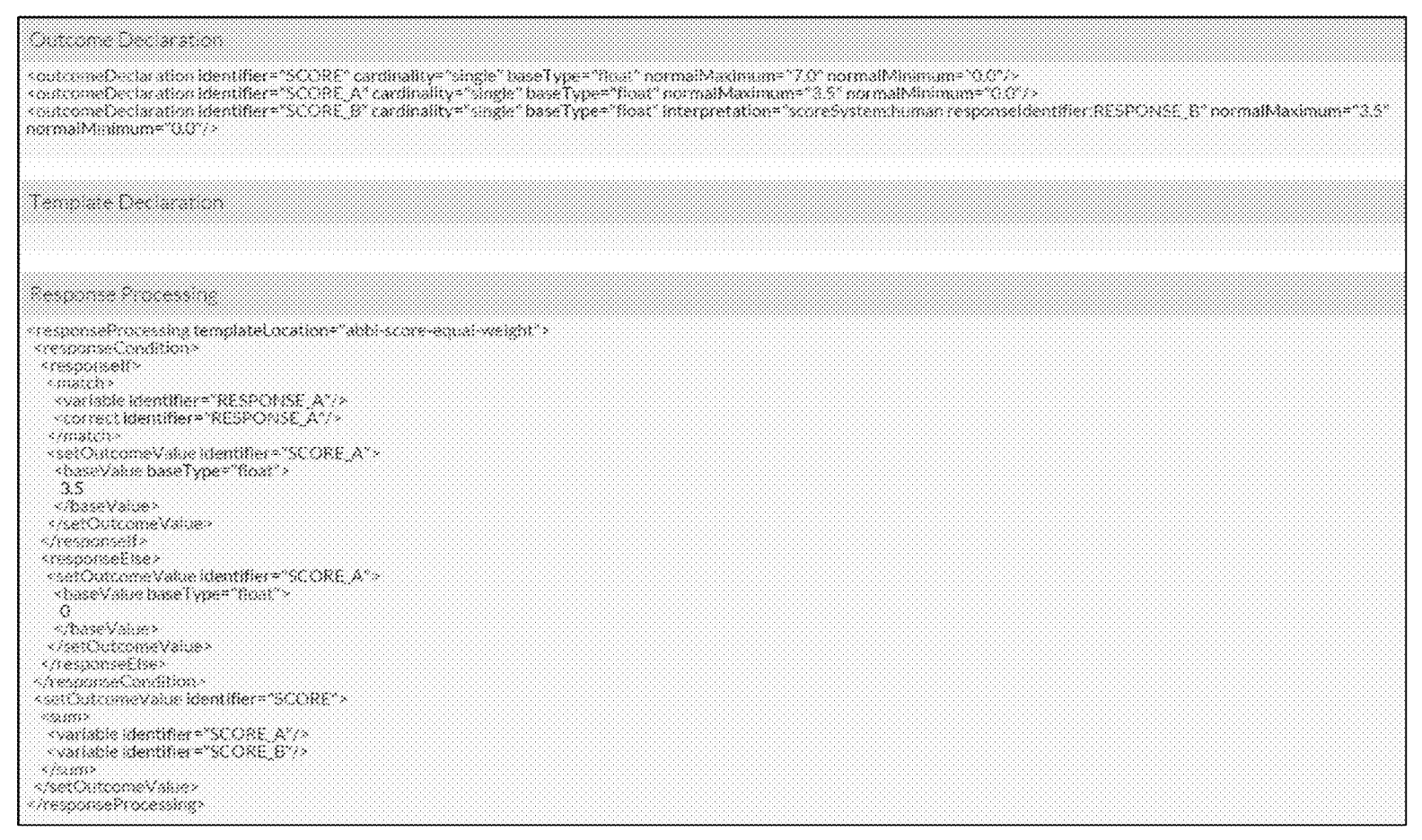
Figure 11G:
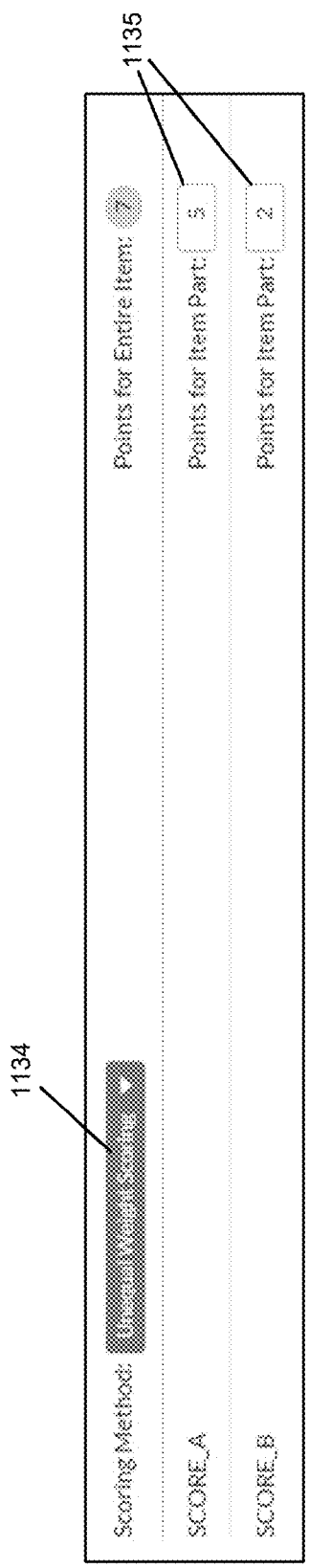
Figure 11H:
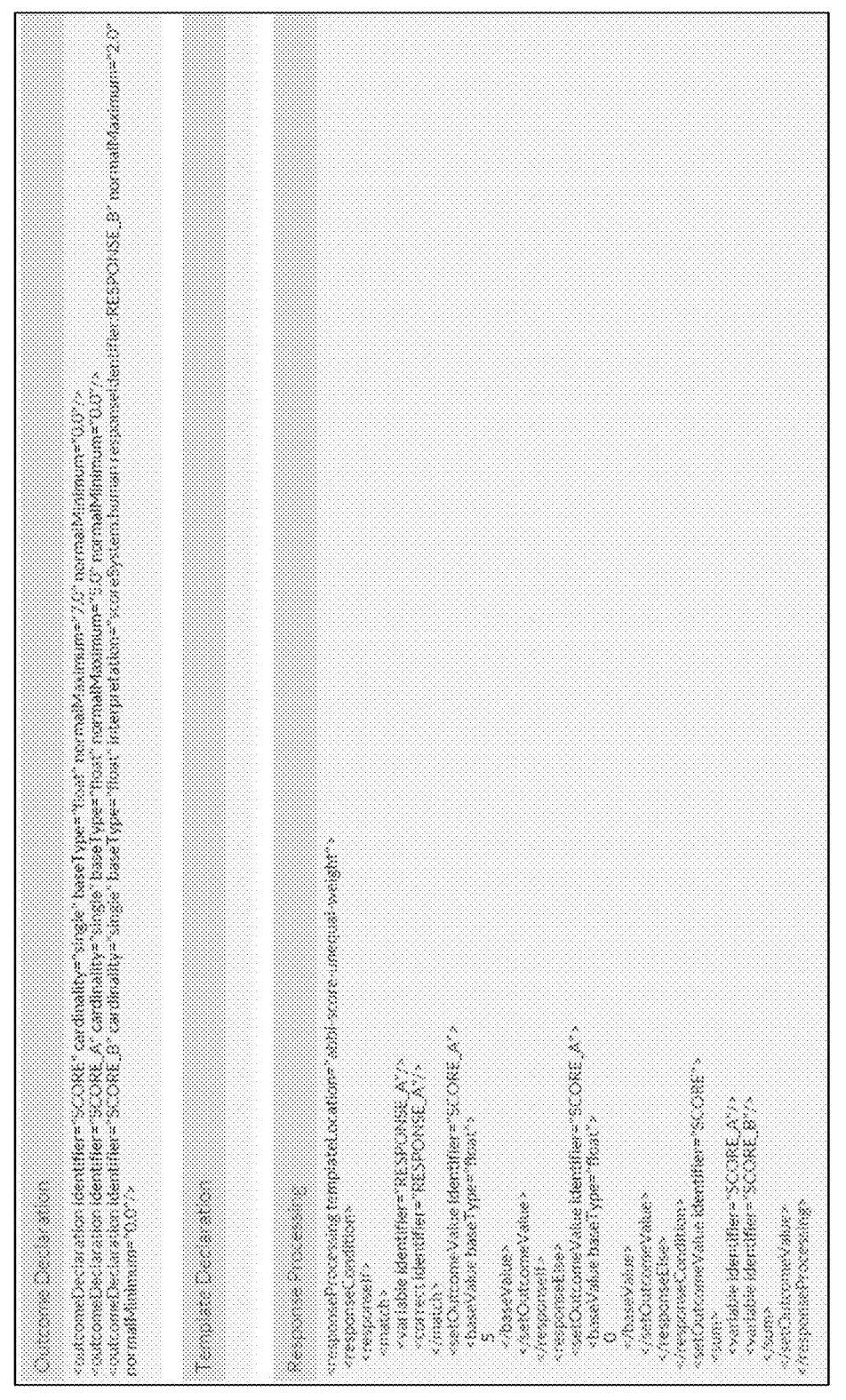
Figure 11I:
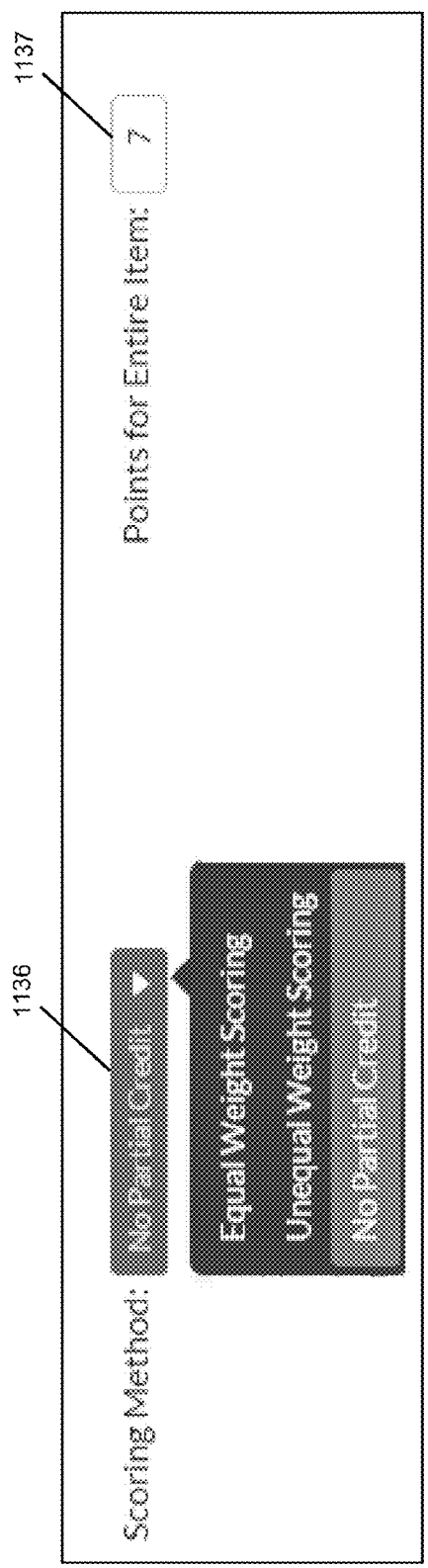

FIGS. 11D-11F continue the example assessment item generation and scoring process of FIGS. 11A-11C, and show the addition of a second assessment component to generate a multi-part assessment item. In FIG. 11D, a second assessment component has been added to second interface region 1120, making the current state of the assessment item a multi-part item containing the first multiple choice assessment component 1121 and a second text entry assessment component 1122. FIGS. 11E, 11G, and 11I are graphical presentations of an assessment item scoring interface generated specifically for the multi-part item shown in FIG. 11D. Referring to FIGS. 11E, 11G, and 11I, based on the number of assessment components currently in the assessment item (i.e., 2), and based on types of the assessment components 1121 and 1122, among other factors, three different scoring types are compatible with this assessment item and available for selection by the user: the equal weight scoring type (FIG. 11E), the unequal weight scoring type (FIG. 11G), and the no partial credit scoring type (FIG. 11I).

Referring to FIG. 11E, as discussed above, the selection of the equal weight scoring type 1132 will cause the assessment item generator 620 to set equal values for each of the assessment components currently within the assessment item. The user may also input/modify the total point value for the assessment item using input box 1133, which will cause each of the separate equal-value point boxes for the assessment components to be updated.

FIG. 11F shows the markup language generated by the assessment item generator 620 in response to the input received via the interface of FIGS. 11D and 11E. In the example of QTI-compliant XML shown in FIG. 11F, it is noted that the assessment item generator 620 has constructed two separate markup language data blocks, an outcomeDeclaration XML element block and a responseProcessing XML element block. These data blocks define, among other things, the scoring logic and point values for the multi-part assessment item. The markup language data blocks may be embedded, together or separately, into one or more QTI-compliant XML assessment items, in order to define and control the scoring logic and parameters for the assessment item Referring to FIG. 11G, as discussed above, the selection of the unequal weight scoring type 1134 will cause the assessment item generator 620 to provide an interface allowing users to set point values separately for each of the assessment components using input boxes 1135. When the user may updates the point value for either assessment component box 1135, the assessment item generator 620 will update the non-editable "Points for Entire Item" field by summing the values of assessment component boxes 1135.

FIG. 11H shows the markup language generated by the assessment item generator 620 in response to the input received via the interface of FIGS. 11D and 11G. In the example of QTI-compliant XML shown in FIG. 11H, it is noted that the assessment item generator 620 has constructed two separate markup language data blocks, an outcomeDeclaration XML element block and a responseProcessing XML element block. These data blocks define, among other things, the scoring logic and point values for the multi-part assessment item. The markup language data blocks may be embedded, together or separately, into one or more QTI-compliant XML assessment items, in order to define and control the scoring logic and parameters for the assessment item Referring to FIG. 11I, as discussed above, the selection of the no partial credit scoring type 1136 will cause the assessment item generator 620 to enforce the requirement that the user (e.g., tesk-taker) must answer all parts of the multi-part assessment item correctly in order to receive the points in editable input box 1137. FIGS. 11J and 11K show the markup language generated by the assessment item generator 620 in response to the input received via the interface of FIGS. 11D and 11I. In the example of QTI-compliant XML shown in FIGS. 11J and 11K, it is noted that the assessment item generator 620 has constructed three separate markup language data blocks, an outcomeDeclaration XML element block, a templateDeclaration XML element block, and a responseProcessing XML element block. As in the previous examples these data blocks may define, among other things, the scoring logic and point values for the multi-part assessment item. The markup language data blocks may be embedded, together or separately, into one or more QTI-compliant XML assessment items, in order to define and control the scoring logic and parameters for the assessment item Finally, referring again to FIG. 10, in step 1006, the assessment item generator 620 may embed the markup language data blocks encoding the scoring data, into the assessment item. Thus, step 1006 may be similar or identical to step 707, discussed above. In the examples shown in FIGS. 11C, 11F, 11H, and 11J-11K, the assessment item generator 620 may embed the separate element blocks (e.g., outcomeDeclaration, templateDeclaration, and responseProcessing) separately and/or at different portions within the assessment item. In some embodiments, steps similar to steps 708, 709, and/or 710 may be performed by the assessment item generator 620 and/or other components within the system, following the embedding of the scoring data encoding into the assessment item. For instance, after embedding the scoring data markup language into the assessment item, the assessment item generator 620 in some embodiments may be configured to perform additional validation and/or revision steps on other affected elements within the QTI-compliant XML, or to save the updated assessment item to the assessment item data store 640.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of generating an assessment item comprising:
   receiving, by an assessment item generator, a request from a client device to generate an assessment item;
   receiving, by the assessment item generator, first input from the client device corresponding to a selection of a first assessment component to be included within the assessment item;
   embedding, by the assessment item generator, a first XML code block comprising XML code content corresponding to the selected first assessment component within a shell markup language data block corresponding to the assessment item to be generated;
   receiving, by the assessment item generator, second input from the client device corresponding to a selection of a second assessment component to be included within the assessment item;
   generating, by the assessment item generator, a second XML code block comprising XML code content corresponding to the selected second assessment component, wherein the second XML code block is generated based on the selected second assessment component;

determining, by the assessment item generator, a relationship between the first and second assessment components within the assessment item;

embedding, by the assessment item generator, the second XML code block corresponding to the second assessment component within the shell markup language data block, wherein the embedding of the second XML code block is based on the determined relationship between the first and second assessment components within the assessment item;

revising, by the assessment item generator, the first XML code block embedded within the shell markup language data block, based on XML content of the second XML code block embedded in the shell markup language data block; and storing, by the assessment item generator, data representing the assessment item, including the shell markup language data block with the embedded first XML code block and the embedded second XML code block, into a data store.

2. The method of claim 1, wherein the received second input corresponding to the selection of the second assessment component to be included within the assessment item, specifies the relationship between the first assessment component and the second assessment component within the assessment item to be generated.

3. The method of claim 2, wherein the received first input corresponds to the selection of a multiple choice assessment component, and wherein the received second input corresponds an option component within the multiple choice assessment component.

4. The method of claim 1, wherein, after the embedding of the second XML code block within the shell markup language data block, the assessment item to be generated is a multi-part assessment item.

5. The method of claim 1, further comprising:
receiving third input from the client device, the third input identifying one of the first assessment component or the second assessment component to be removed from the assessment item;
updating the shell markup language data block by removing either the first XML code block or the second XML code block, based on the assessment component identified within the third input; and
updating the shell markup language data block further by revising the one of the first XML code block or the second XML code block that was not removed from the shell markup language data block.

6. The method of claim 1, further comprising:
receiving third input from the client device corresponding to a selection of a third assessment component to be included within the assessment item;
generating a third XML code block corresponding to the selected third assessment component, wherein the generation of the third XML code block is based on the first XML code block and the second XML code block;
embedding the third XML code block within the shell markup language data block;
revising the first XML code block embedded within the shell markup language data block, based on the embedding of the third XML code block; and
revising the second XML code block embedded within the shell markup language data block, based on the embedding of the third XML code block.

7. The method of claim 1, wherein generating the first XML code block, and generating the second XML code block, each comprise generating extensible markup language (XML) compliant with a Question & Test Interoperability (QTI) specification.

8. The method of claim 1, further comprising:
in response to receiving the second input, validating the compatibility of the selected second assessment component with the selected first assessment component within the assessment item to be generated.

9. The method of claim 1, wherein determining the relationship between the first assessment component and the second assessment component comprises determining that the second assessment component is to be embedded within the first assessment component, and
wherein embedding the second XML code block comprises embedding the second XML code block within the first XML code block.

10. The method of claim 1, wherein determining the relationship between the first assessment component and the second assessment component comprises determining that the second assessment component is to be embedded before or after the first assessment component within the assessment item, and
wherein embedding the second XML code block comprises embedding the second XML code block within the shell markup language data block, before or after first XML code block, based on the determination that the second assessment component is to be embedded before or after the first assessment component within the assessment item.

11. The method of claim 10, wherein the generation of the second XML code block, and the revision of the first XML code block embedded within the shell markup language data block, are based on the determination that the second assessment component is to be embedded before or after the first assessment component within the assessment item.

12. The method of claim 11, wherein the selected first assessment component and the selected second assessment component each correspond to one or more of: a multiple choice assessment item component, a text input assessment item component, a gap match assessment item component, a graph assessment item component, a slider assessment item component, or an equation editor assessment item component.

13. An assessment item generator system comprising:
a processing unit comprising one or more processors; and
memory coupled with and readable by the processing unit and storing therein a set of instructions which, when executed by the processing unit, causes the assessment item generator system to:
receive a request from a client device to generate an assessment item;
receive first input from the client device corresponding to a selection of a first assessment component to be included within the assessment item;
embed a first XML code block comprising XML code content corresponding to the selected first assessment component within a shell markup language data block corresponding to the assessment item to be generated;
receive second input from the client device corresponding to a selection of a second assessment component to be included within the assessment item;
generate a second XML code block comprising XML code content corresponding to the selected second assessment component, wherein the second XML code block is generated based on the selected second assessment component;

determine a relationship between the first and second assessment components within the assessment item;

embed the second XML code block corresponding to the second assessment component within the shell markup language data block, wherein the embedding of the second XML code block is based on the determined relationship between the first and second assessment components within the assessment item;

revise the first XML code block embedded within the shell markup language data block, based on XML content of the second XML code block embedded in the shell markup language data block; and store data representing the assessment item to be generated, including the shell markup language data block with the embedded first XML code block and the embedded second XML code block, into a data store.

14. The assessment item generator system of claim 13, the memory of the assessment item generator storing therein further instructions which, when executed by the processing unit, causes the assessment item generator system to:

receive third input from the client device, the third input identifying one of the first assessment component or the second assessment component to be removed from the assessment item to be generated;

update the shell markup language data block by removing either the first XML code block or the second XML code block, based on the assessment component identified within the third input; and update the shell markup language data block further by revising the one of the first XML code block or the second XML code block that was not removed from the shell markup language data block.

15. The assessment item generator system of claim 13, the memory of the assessment item generator storing therein further instructions which, when executed by the processing unit, causes the assessment item generator system to:

receive third input from the client device corresponding to a selection of a third assessment component to be included with the first assessment component and the second assessment component within the assessment item;

generate a third XML code block corresponding to the selected third assessment component, wherein the generation of the third XML code block is based on the first XML code block and the second XML code block;

embed the third XML code block within the shell markup language data block;

revise the first XML code block embedded within the shell markup language data block, based on the embedding of the third XML code block; and revise the second XML code block embedded within the shell markup language data block, based on the embedding of the third XML code block.

16. The assessment item generator system of claim 13, the memory of the assessment item generator storing therein further instructions which, when executed by the processing unit, causes the assessment item generator system to:

in response to receiving the second input, validate the compatibility of the selected second assessment component with the selected first assessment component within the assessment item to be generated.

17. The assessment item generator system of claim 13, wherein determining the relationship between the first assessment component and the second assessment component comprises determining that the second assessment component is to be embedded before or after the first assessment component within the assessment item, and wherein embedding the second XML code block comprises embedding the second XML code block within the shell markup language data block, before or after first XML code block, based on the determination that the second assessment component is to be embedded before or after the first assessment component within the assessment item.

18. A computer-program product tangibly embodied in a non-transitory machine-readable storage medium, including instructions configured to cause one or more data processors to perform actions including comprising:

receiving a request from a client device to generate an assessment item;

receiving first input from the client device corresponding to a selection of a first assessment component to be included within the assessment item;

embedding a first XML code block comprising XML code content corresponding to the selected first assessment component within a shell markup language data block corresponding to the assessment item to be generated;

receiving second input from the client device corresponding to a selection of a second assessment component to be included within the assessment item;

generating a second XML code block comprising XML code content corresponding to the selected second assessment component, wherein the second XML code block is generated based on the selected second assessment component;

determining a relationship between the first and second assessment components within the assessment item;

embedding the second XML code block corresponding to the second assessment component within the shell markup language data block, wherein the embedding of the second XML code block is based on the determined relationship between the first and second assessment components within the assessment item;

revising the first XML code block embedded within the shell markup language data block, based on XML content of the second XML code block embedded in the shell markup language data block; and storing data representing the assessment item, including the shell markup language data block with the embedded first XML code block and the embedded second XML code block, into a data store.

19. The computer-program product of claim 18, including further instructions configured to cause the one or more data processors to perform actions including:

receiving third input from the client device, the third input identifying one of the first assessment component or the second assessment component to be removed from the assessment item to be generated;

updating the shell markup language data block by removing the first XML code block or the second XML code block, based on the assessment component identified within the third input; and updating the shell markup language data block by revising the one of the first XML code block or the second XML code block that was not removed from the shell markup language data block.

20. The computer-program product of claim 18, including further instructions configured to cause the one or more data processors to perform actions including:

receiving third input from the client device corresponding to a selection of a third assessment component to be included with the first assessment component and the second assessment component within the assessment item;
generating a third XML code block corresponding to the selected third assessment component, wherein the generation of the third XML code block is based on the first XML code block and the second XML code block;
embedding the third XML code block within the shell markup language data block;
revising the first XML code block embedded within the shell markup language data block, based on the embedding of the third XML code block; and
revising the second XML code block embedded within the shell markup language data block, based on the embedding of the third XML code block.

* * * * *